US007496268B2

(12) United States Patent
Escoto et al.

(10) Patent No.: US 7,496,268 B2
(45) Date of Patent: Feb. 24, 2009

(54) HIGH DENSITY FIBER OPTIC HARDWARE

(75) Inventors: Alejandro Raigoza Escoto, Reynosa (MX); Manuel Alejandro Lopez Sanchez, Reynosa (MX); Octavio Beltran Salinas, Reynosa (MX); Gerardo Pavon, Reynosa (MX); James P. Luther, Hickory, NC (US); Christopher Paul Lewallen, Hudson, NC (US); William Hurley, Hickory, NC (US); Todd Edward Mitchell, Fort Worth, TX (US); Cesar Geronimo Garcia, North Richland Hills, TX (US); William Giraud, Springtown, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/638,606

(22) Filed: Dec. 13, 2006

(65) Prior Publication Data
US 2008/0145013 A1      Jun. 19, 2008

(51) Int. Cl.
*G02B 6/00* (2006.01)
(52) U.S. Cl. .................. 385/134; 385/135; 385/136; 385/137; 385/138
(58) Field of Classification Search ................ 385/134
See application file for complete search history.

(56) References Cited

U.S. PATENT DOCUMENTS

| 4,736,100 A | 4/1988 | Vastagh ................... 250/227 |
| 4,747,020 A | 5/1988 | Brickley et al. ............ 361/428 |
| 4,824,193 A | 4/1989 | Maeda et al. ............. 350/3.72 |
| 4,900,123 A | 2/1990 | Barlow et al. ............. 350/96.2 |
| 4,948,220 A | 8/1990 | Violo et al. ................ 350/96.2 |
| 4,995,688 A | 2/1991 | Anton et al. ............... 350/96.1 |
| 5,023,646 A | 6/1991 | Ishida et al. ................ 354/402 |
| 5,073,042 A | 12/1991 | Mulholland et al. .......... 385/69 |
| 5,076,688 A | 12/1991 | Bowen et al. .............. 356/73.1 |
| 5,142,598 A | 8/1992 | Tabone ........................ 385/78 |
| 5,214,735 A | 5/1993 | Henneberger et al. ....... 385/136 |
| 5,233,674 A | 8/1993 | Vladic .......................... 385/56 |
| 5,260,957 A | 11/1993 | Hakimi et al. ................ 372/39 |
| 5,274,731 A | 12/1993 | White ......................... 385/135 |
| 5,317,663 A | 5/1994 | Beard et al. ................... 385/70 |
| 5,333,221 A | 7/1994 | Briggs et al. .................. 385/55 |
| 5,333,222 A | 7/1994 | Belenkiy et al. .............. 385/70 |
| 5,359,688 A | 10/1994 | Underwood ................. 385/70 |

(Continued)

OTHER PUBLICATIONS

Hitachi Cable Review No. 24, "Low-loss Holey Fiber", Aug. 2005, 5 pages.

(Continued)

*Primary Examiner*—Frank G Font
*Assistant Examiner*—Mary A El Shammaa
(74) *Attorney, Agent, or Firm*—John H. Vynalek

(57) ABSTRACT

There is provided fiber optic hardware and hardware components adapted to provide a desired amount of fiber optic connectivity and/or functionality for a desired amount of volume, materials, etc. The fiber optic hardware components include, but are not limited to multiports, local convergence points (LCPs), particularly LCPs for multiple dwelling units or similar applications, network interface devices, equipment frames, and fiber distribution hubs. Certain fiber optic hardware components are adapted to accommodate microstructured optical fiber or other bend performance optical fiber.

23 Claims, 19 Drawing Sheets

U.S. PATENT DOCUMENTS

| | | | |
|---|---|---|---|
| 5,367,598 A | 11/1994 | Devenish, III et al. | 385/135 |
| 5,402,515 A | 3/1995 | Vidacovich et al. | 385/135 |
| 5,408,557 A | 4/1995 | Hsu | 385/72 |
| RE34,955 E | 5/1995 | Anton et al. | 385/53 |
| 5,420,958 A | 5/1995 | Henson et al. | 385/135 |
| 5,442,726 A | 8/1995 | Howard et al. | 385/135 |
| 5,448,015 A | 9/1995 | Jamet et al. | 174/68.3 |
| 5,497,444 A | 3/1996 | Wheeler | 385/135 |
| 5,542,015 A | 7/1996 | Hultermans | 385/60 |
| 5,647,043 A | 7/1997 | Anderson et al. | 385/78 |
| 5,708,751 A | 1/1998 | Mattei | 385/135 |
| 5,734,776 A | 3/1998 | Puetz | 385/134 |
| 5,774,612 A | 6/1998 | Belenkiy et al. | 385/72 |
| 5,823,646 A | 10/1998 | Arizpe et al. | 312/324 |
| 5,825,955 A | 10/1998 | Ernst et al. | 385/79 |
| 5,881,200 A | 3/1999 | Burt | 385/142 |
| 5,883,995 A | 3/1999 | Lu | 385/60 |
| 5,930,425 A | 7/1999 | Abel et al. | 385/53 |
| 5,945,633 A | 8/1999 | Ott et al. | 174/59 |
| 5,956,444 A | 9/1999 | Duda et al. | 385/53 |
| 5,969,294 A | 10/1999 | Eberie et al. | 174/57 |
| 6,027,252 A | 2/2000 | Erdman et al. | 385/76 |
| 6,044,193 A | 3/2000 | Szentesi et al. | 385/134 |
| 6,061,492 A | 5/2000 | Strause et al. | 385/135 |
| 6,079,881 A | 6/2000 | Roth | 385/76 |
| 6,149,315 A | 11/2000 | Stephenson | 385/60 |
| 6,160,946 A | 12/2000 | Thompson et al. | 385/135 |
| 6,188,687 B1 | 2/2001 | Mussman et al. | 370/388 |
| 6,188,825 B1 | 2/2001 | Bandy et al. | 385/134 |
| 6,208,796 B1 | 3/2001 | Williams Vigliaturo | 385/135 |
| 6,220,413 B1 * | 4/2001 | Walters et al. | 191/12.4 |
| 6,227,717 B1 | 5/2001 | Ott et al. | 385/53 |
| 6,234,683 B1 | 5/2001 | Waldron et al. | 385/78 |
| 6,236,795 B1 | 5/2001 | Rodgers | 385/134 |
| 6,240,229 B1 | 5/2001 | Roth | 385/53 |
| 6,278,829 B1 | 8/2001 | BuAbbud et al. | 385/135 |
| 6,307,997 B1 | 10/2001 | Walters et al. | 385/134 |
| RE37,489 E | 1/2002 | Anton et al. | 385/53 |
| 6,347,888 B1 | 2/2002 | Puetz | 385/53 |
| 6,363,198 B1 | 3/2002 | Braga et al. | 385/134 |
| 6,363,200 B1 | 3/2002 | Thompson et al. | 385/135 |
| 6,411,767 B1 | 6/2002 | Burrous et al. | 385/135 |
| 6,424,781 B1 | 7/2002 | Puetz et al. | 385/135 |
| 6,425,694 B1 | 7/2002 | Szilagyi et al. | 385/76 |
| 6,431,762 B1 | 8/2002 | Taira et al. | 385/56 |
| 6,434,313 B1 | 8/2002 | Clapp, Jr. et al. | 385/135 |
| 6,452,925 B1 | 9/2002 | Sistanizadeh et al. | 370/352 |
| 6,464,402 B1 | 10/2002 | Andrews et al. | 385/53 |
| D466,087 S | 11/2002 | Cuny et al. | D13/152 |
| 6,480,487 B1 | 11/2002 | Wegleitner et al. | 370/354 |
| 6,483,977 B2 | 11/2002 | Battey et al. | 385/135 |
| 6,496,640 B1 | 12/2002 | Harvey et al. | 385/135 |
| 6,539,147 B1 | 3/2003 | Mahony | 385/24 |
| 6,539,160 B2 | 3/2003 | Battey et al. | 385/135 |
| 6,542,688 B1 | 4/2003 | Battey et al. | 385/135 |
| 6,554,485 B1 | 4/2003 | Beatty et al. | 385/72 |
| 6,577,595 B1 | 6/2003 | Counterman | 370/230 |
| 6,577,801 B2 | 6/2003 | Broderick et al. | 385/125 |
| 6,597,670 B1 | 7/2003 | Tweedy et al. | 370/328 |
| 6,614,980 B1 | 9/2003 | Mahony | 385/135 |
| 6,621,975 B2 | 9/2003 | Laporte et al. | 385/135 |
| 6,625,375 B1 | 9/2003 | Mahony | 385/135 |
| 6,631,237 B2 | 10/2003 | Knudsen | 385/134 |
| 6,654,536 B2 | 11/2003 | Battey et al. | 385/134 |
| 6,668,127 B1 | 12/2003 | Mahony | 385/135 |
| 6,710,366 B1 | 3/2004 | Lee et al. | 257/14 |
| 6,778,752 B2 | 8/2004 | Laporte et al. | 385/135 |
| 6,819,856 B2 | 11/2004 | Dagley et al. | 385/134 |
| 6,850,685 B2 | 2/2005 | Tinucci et al. | 385/134 |
| 6,870,734 B2 | 3/2005 | Mertesdorf et al. | 381/684 |
| 6,920,273 B2 | 7/2005 | Knudsen | 385/135 |
| 6,920,274 B2 | 7/2005 | Rapp et al. | 385/135 |
| 6,925,241 B2 | 8/2005 | Bohle et al. | 381/135 |
| 6,968,107 B2 | 11/2005 | Belardi et al. | 385/127 |
| 7,006,748 B2 | 2/2006 | Dagley et al. | 385/134 |
| 7,054,513 B2 | 5/2006 | Herz et al. | 385/12 |
| 7,103,255 B2 | 9/2006 | Reagan et al. | 385/135 |
| 7,120,347 B2 | 10/2006 | Blackwell, Jr. et al. | 385/135 |
| 2002/0034290 A1 | 3/2002 | Pershan | 379/207.02 |
| 2003/0174996 A1 | 9/2003 | Henschel et al. | 385/135 |
| 2004/0074852 A1 | 4/2004 | Knudsen et al. | 211/26 |
| 2004/0228598 A1 | 11/2004 | Allen et al. | 385/135 |
| 2004/0264873 A1 | 12/2004 | Smith et al. | 385/53 |
| 2005/0002633 A1 | 1/2005 | Solheid et al. | 385/135 |
| 2005/0105873 A1 | 5/2005 | Reagan et al. | 385/135 |
| 2005/0129379 A1 | 6/2005 | Reagan et al. | 385/135 |
| 2005/0163448 A1 | 7/2005 | Blackwell, Jr. et al. | 385/135 |
| 2006/0093302 A1 | 5/2006 | Solheid et al. | 385/135 |
| 2006/0093303 A1 | 5/2006 | Reagan et al. | 385/135 |
| 2006/0153517 A1 | 7/2006 | Reagan et al. | 385/135 |
| 2007/0104437 A1 | 5/2007 | Bookbinder et al. | 385/125 |

OTHER PUBLICATIONS

Draka, Draka Comteq | Optical Fibre, "BendBright$^{xs}$ Single Mode Optical Fibre, Enhanced low macrobending sensitive, low water peak fibre, Product Type: G.652D, Coating Type: ColorLock™ and Natural", Issue Date: Aug. 2006, Supersedes. -/-, www.drakafibre.com | www.draka.com, 2 pages.

International Telecommunication Union, ITU-T G.652, Telecommunication Standardization Sector of ITU, Jun. 2005, Series G: Transmission Systems and Media, Digital Systems and Networks, Transmission media characteristics—Optical fibre cables, Characteristics of a single-mode optical fibre and cable, ITU-T Recommendation G.652, 22 pgs.

International Telecommunication Union, ITU-T G.657, Telecommunication Standardization Sector of ITU, Dec. 2006, Series G: Transmission Systems and Media, Digital Systems and Networks, Transmission media and optical systems characteristics—Optical Fibre Cables, Characteristics of a bending loss insensitive single mode optical fibre and cable for the access network, ITU-T Recommendation G.657, 20 pgs.

Gibson et al., Evanescent Field Analysis of Air-Silica Microstructure Waveguides, IEEE, 0-7803-7105-Apr. 2001, pp. 709-710.

Monro et al., "Holey Fibers with random cladding distributions" Optic Letters, vol. 25, No. 4; Feb. 15, 2000.

Pickrell et al., "Novel Techniques for the Fabrication of Holey Optical Fibers" Spie Conference Proceedings, vol. 4578, pp. 271-282; 2001.

Ellis, et al., "Microstructural Analysis of Random Hole Optical Fibers," IEEE Photonics Technology Letters, IEEE Service Center, Piscataway, NY, US, vol. 16, No. 2, Feb. 2004, pp. 491-493.

Patent Cooperation Treaty, Annex to the Invitation to Pay Additional Fees, Communication Relating to the Results of the Partial International Search, International Application No. PCT/US07/025155, 4 pages.

Patent Cooperation Treaty, International Search Report for International Application No. PCT/US2007/025155, Aug. 26, 2008, 2 pages.

* cited by examiner

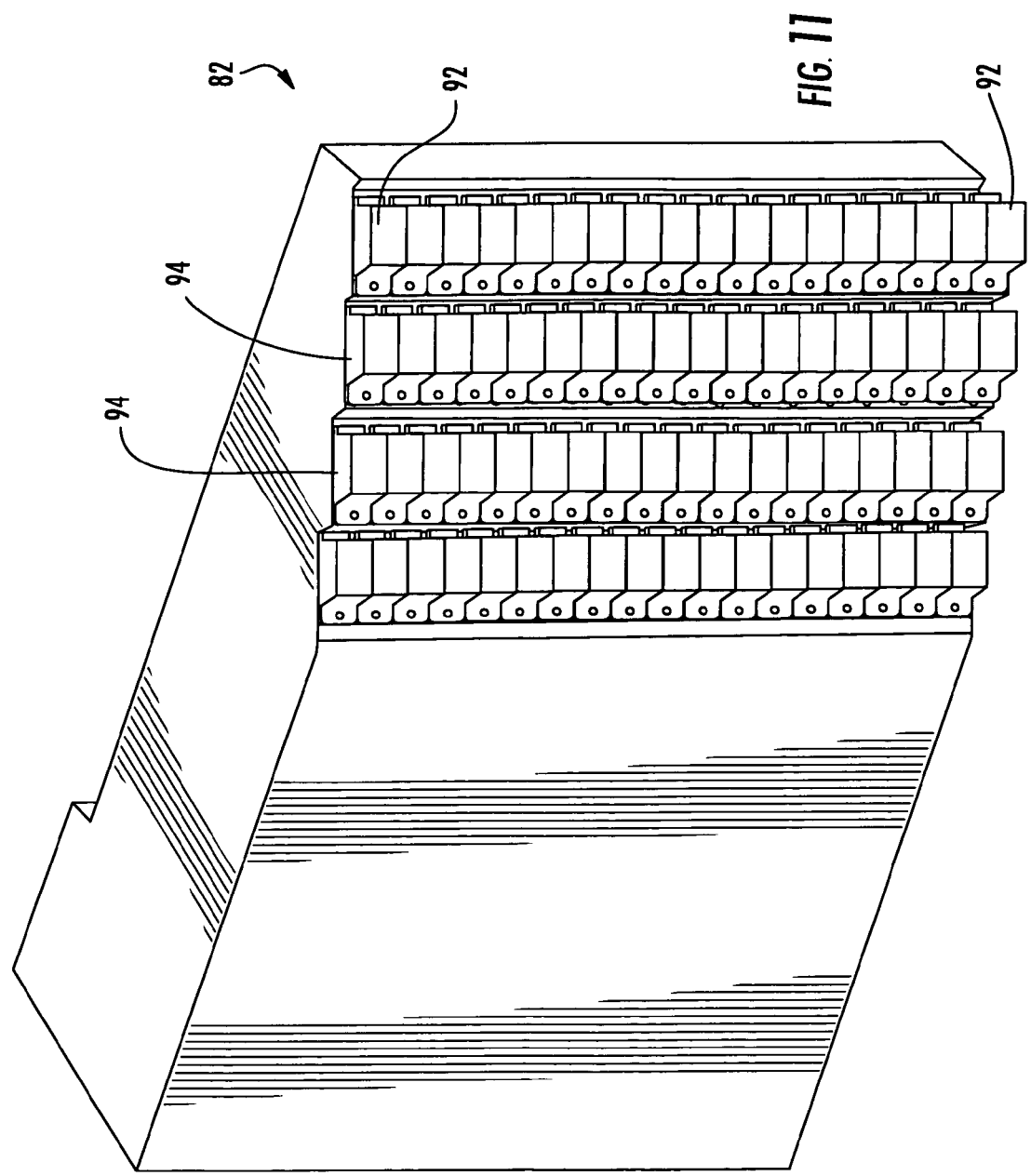

HIGH DENSITY FIBER OPTIC HARDWARE

CROSS-REFERENCE TO RELATED APPLICATIONS

This application incorporates by reference U.S. patent application entitled "FIBER OPTIC CABLES AND ASSEMBLIES AND THE PERFORMANCE THEREOF", filed this same day and assigned to Corning Cable Systems LLC.

BACKGROUND OF THE INVENTION

1. Field of the Invention

The present invention is related to fiber optic hardware components, and more particularly, to novel fiber optic hardware and hardware components.

2. Description of Related Art

Along with the increase in the deployment of "Fiber-to-the-Premises" (FTTP) optical networks, a need has arisen for increasing the performance, manageability, handleability, and flexibility of fiber optic cables, cable assemblies, and network components in general. With respect to outdoor installation environments, cables, cable assemblies, and other network components are being developed that are more easily interconnected and installed within their environment, such as within aerial installation environments or through small diameter conduit. With respect to indoor environments and multi-dwelling units, cables, cable assemblies, connection terminals, and other network components are being developed to improve installation aesthetics and handle the interconnection of an increasing number of subscribers. Within both environments, it would be desirable to develop components that perform better, are more flexible to installation stresses, and are more robust and long lasting, thus saving time and costs.

Conventional cables, cable assemblies, fiber optic hardware, and other network components typically define structure that accommodates, and is in part, limited by the physical characteristics of the optical fibers contained therein. In other words, it is oftentimes the case that the physical and performance limitations of the optical fibers partly define assembly structure and processes associated with manufacturing the assemblies. Thus, optical fibers are one limiting factor in the evolution of fiber optic networks.

Therefore, it is desired to provide fiber optic hardware with architectures that provide fiber optic network functionality while requiring less volume and materials than conventional fiber optic hardware components. It is also desired to improve the functionality, performance, and/or dependability of such fiber optic hardware components.

BRIEF SUMMARY OF THE INVENTION

The various embodiments of the present invention address the above needs and achieve other advantages by providing various fiber optic hardware and hardware components that include improved size, functionality, density, and other features. The fiber optic hardware and hardware components include, but are not limited to multi-port optical connection terminals, optical connection terminals, fiber optic equipment racks and associated modules, splitter modules, and/or fiber distribution hubs.

One embodiment of the present invention provides a multi-port optical connection terminal for interconnecting optical fibers of one or more fiber optic drop cables with a fiber optic distribution cable. The multi-port optical connection terminal comprises a housing that defines an exterior wall and an interior cavity, a stub cable in optical communication with the fiber optic distribution cable, and a stub cable port provided in the exterior wall of the housing through which the stub cable passes into the interior cavity of the housing. The multi-port optical connection terminal also includes a plurality of connector ports provided on the exterior wall of the housing, wherein the connector ports are adapted to receive at least one fiber optic connector of an optic fiber in optical communication with the stub cable from inside the terminal and a connectorized end of a fiber optic drop cable from outside the terminal. In addition, the multi-port optical connection terminal also comprises a stub cable slack storage compartment defined within the interior cavity of the housing in which supplementary length of the stub cable is selectively retractable from the stub cable slack storage compartment. Therefore, certain multi-port optical connection terminals of the present invention comprise stub cables of adjustable length to thereby provide more freedom to technicians in the field when connecting and mounting the multi-port optical connection terminal.

Another embodiment of the present invention provides an optical connection terminal for interconnecting optical fibers of one or more fiber optic subscriber cables with a fiber optic network cable. The terminal comprises a housing defining an exterior wall and an interior cavity, wherein the interior cavity is selectively accessible through at least one moveable wall portion. The exterior wall includes at least one opening for the ingress and egress of the one or more fiber optic subscriber cables and one or more fiber optic network cables. The terminal also includes at least one splitter module within the interior cavity to split the optical signal of at least one fiber optic network cable to at least two fiber optic subscriber cables. The terminal housing is adapted to define a density of subscriber fibers to unit of volume of the interior cavity of at least 50 fibers/ft$^3$. Therefore, optical connection terminals of the present invention are capable of providing additional connectivity for a given volume and/or providing smaller terminals that provide more freedom to technicians in the field when mounting the terminals.

A further embodiment of the present invention provides a fiber optic equipment rack for interconnecting optical fibers of one or more fiber optic subscriber cables with a fiber optic network cable in an indoor environment. The equipment rack comprises a frame with at least two vertical supports and at least one horizontal support joined therebetween. The equipment rack also include at least one subscriber termination module selectively mounted to the frame, wherein the at least one subscriber termination module provides for selective optical connection of one or more fiber optic subscriber cables with one or more fiber optic network cables at a subscriber termination. The subscriber termination module defines a density of subscriber terminations to unit of volume of the subscriber termination module of at least 80 terminations/ft$^3$. Therefore, a significantly greater number of subscribers may be serviced with an equipment rack compared to conventional equipment racks and/or the equipment racks may be significantly smaller, more cost effective, and/or more easily installed in a greater range of areas.

Still further embodiments of the present invention provide fiber distribution hubs for interconnecting optical fibers of one or more fiber optic subscriber cables with a fiber optic network cable. The fiber distribution hub comprises a housing with an exterior wall and an interior cavity, wherein the interior cavity is selectively accessible through at least one moveable wall portion, such as a door. The fiber distribution hub also includes at least one opening through the exterior wall for the ingress and egress of the one or more fiber optic subscriber cables and one or more fiber optic network cables. The fiber distribution hub comprises at least one splitter module within the interior cavity to split the optical signal of at least one fiber optic network cable to a plurality of network pigtails. At least one subscriber termination field is included within the fiber distribution hub, is mounted within the housing, and is adapted to selectively optically connect the network pigtails to the fiber optic subscriber cables at subscriber terminations. The housing of the fiber distribution hub defines a density of subscriber terminations to unit of volume of the housing of at least 100 terminations/ft$^3$. Thus, similar to the embodiments described above, the fiber distribution hubs of the present invention may service a significantly greater number of subscribers compared with conventional fiber distribution hubs and/or the fiber distribution hubs may be significantly smaller, more cost effective, and/or more easily installed in a greater range of areas.

Therefore, the fiber optic hardware and associated hardware components of various embodiments of the present invention provide for high density connectivity of fiber optic subscriber cables to fiber optic network cables. In addition, certain embodiments of the present invention provide for novel functionality not previously available with conventional fiber optic hardware.

BRIEF DESCRIPTION OF THE SEVERAL VIEWS OF THE DRAWINGS

Figure 1:
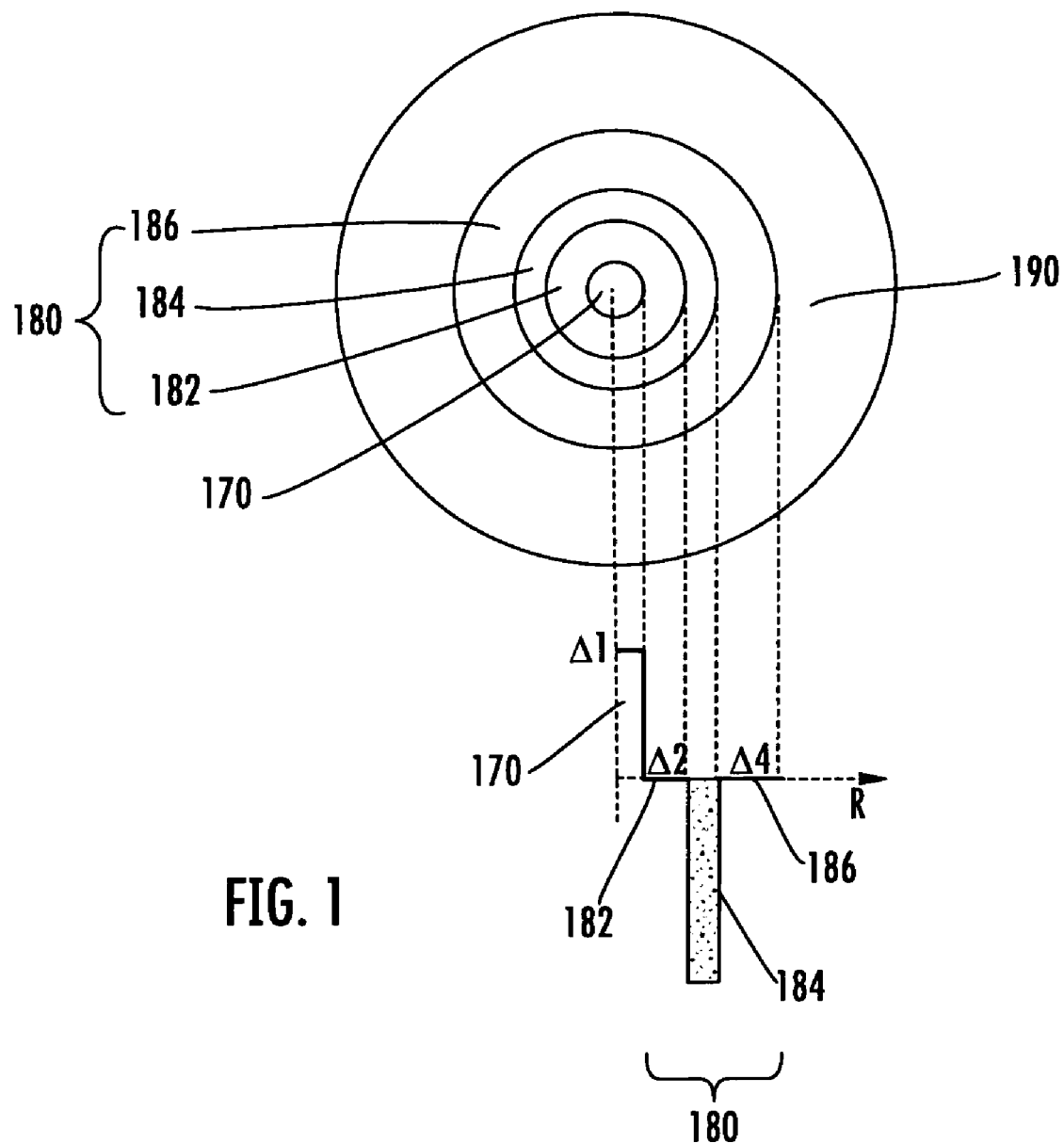
Figure 2:
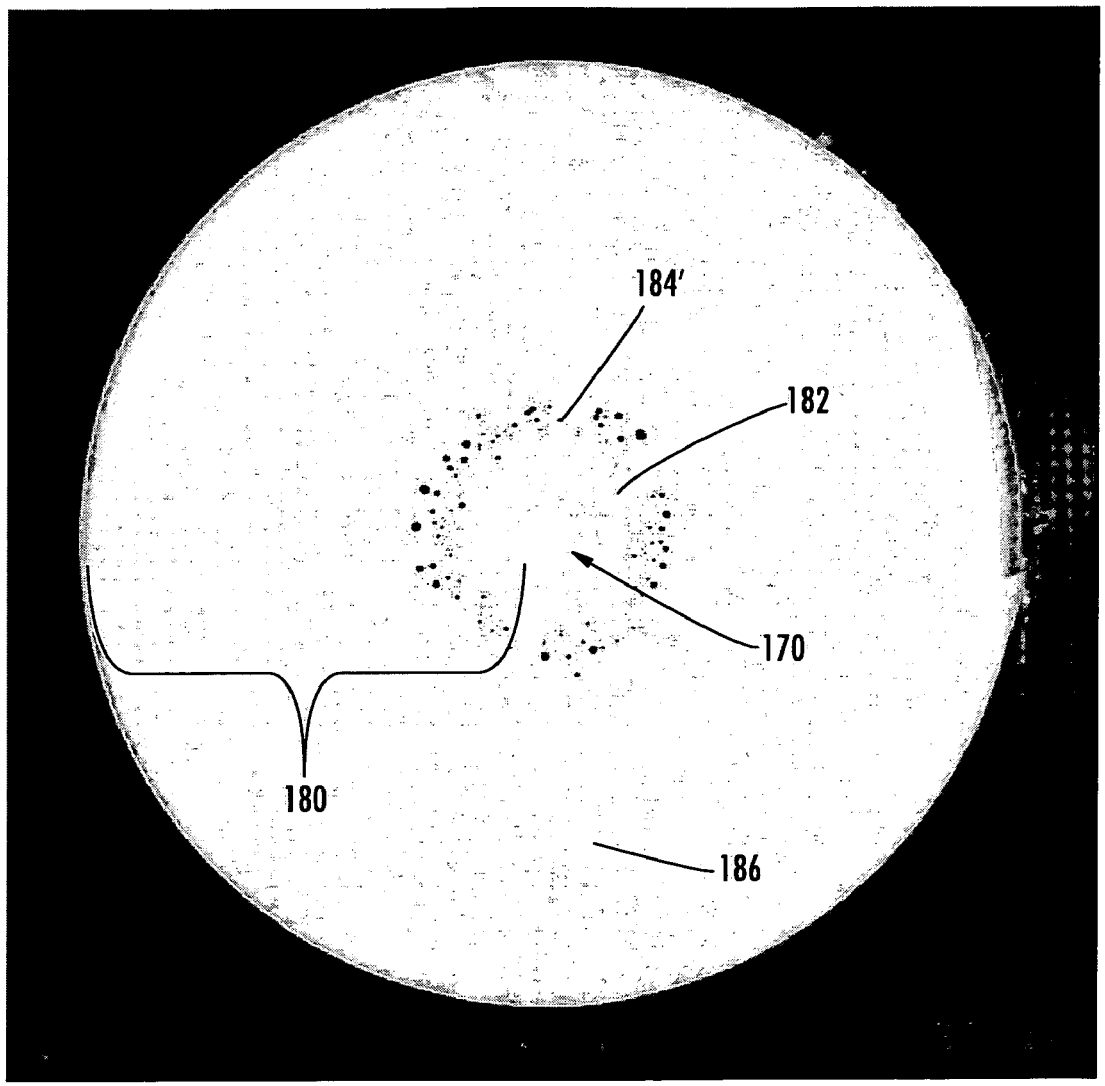
Figure 3:
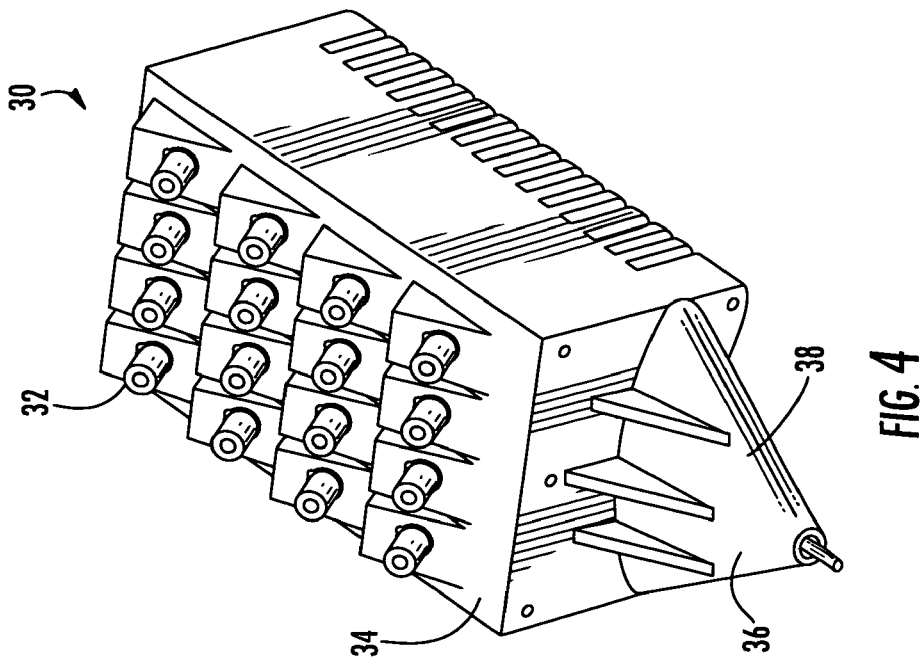
Figure 4:
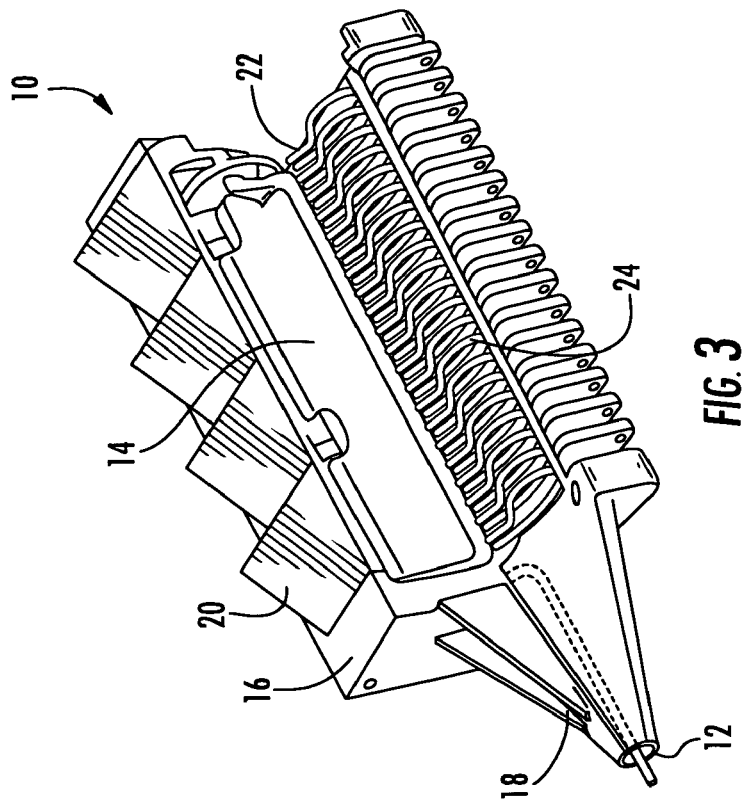
Figure 6:
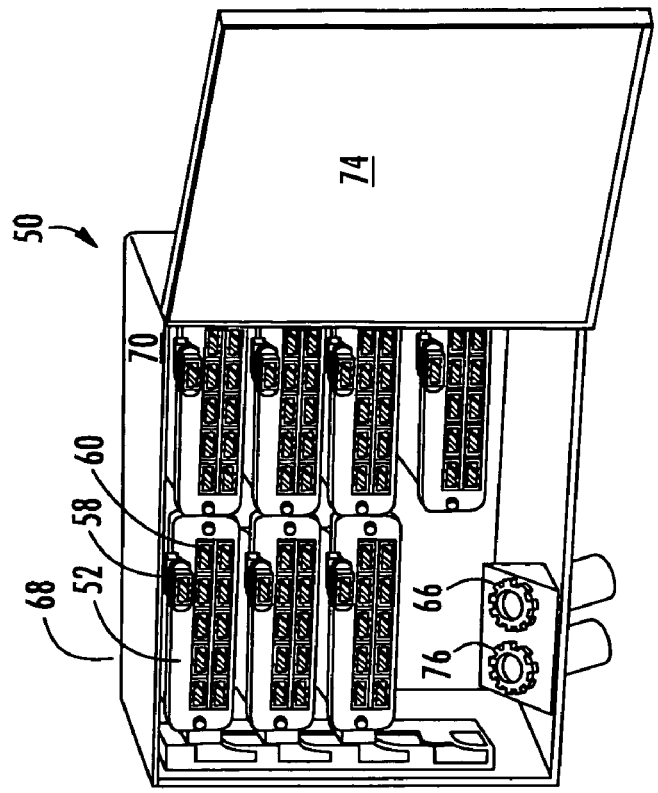
Figure 5:
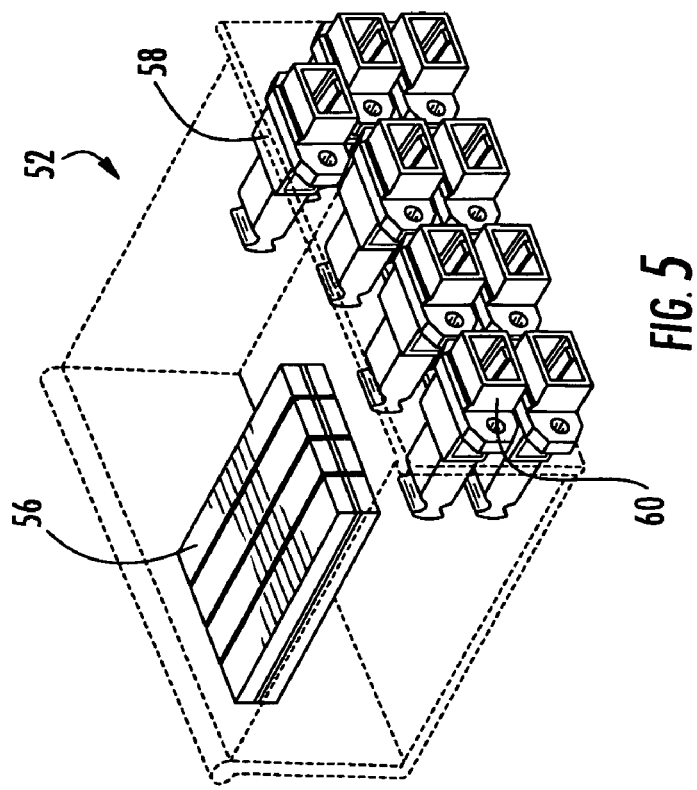
Figure 7:
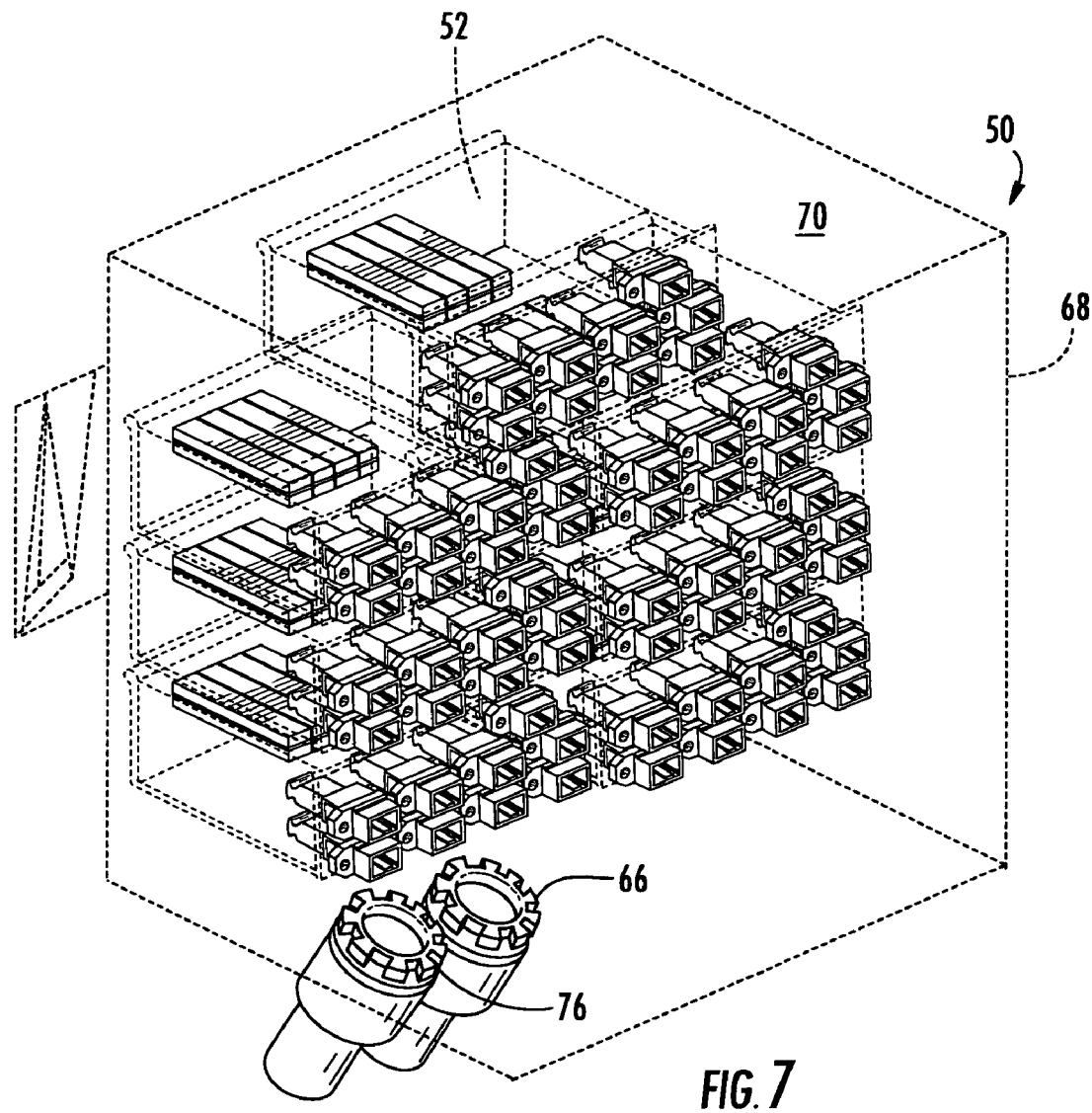
Figure 8:
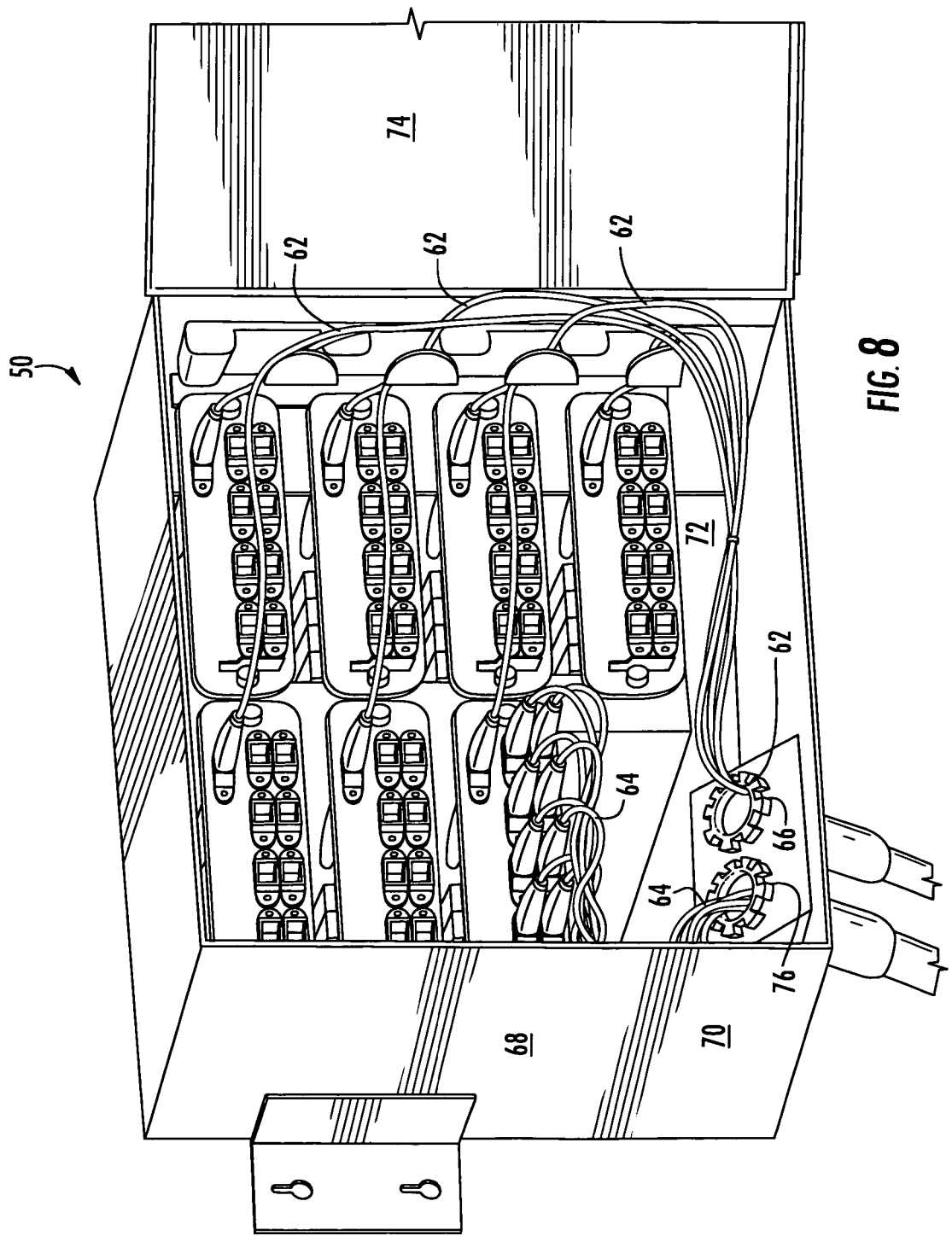
Figure 9:
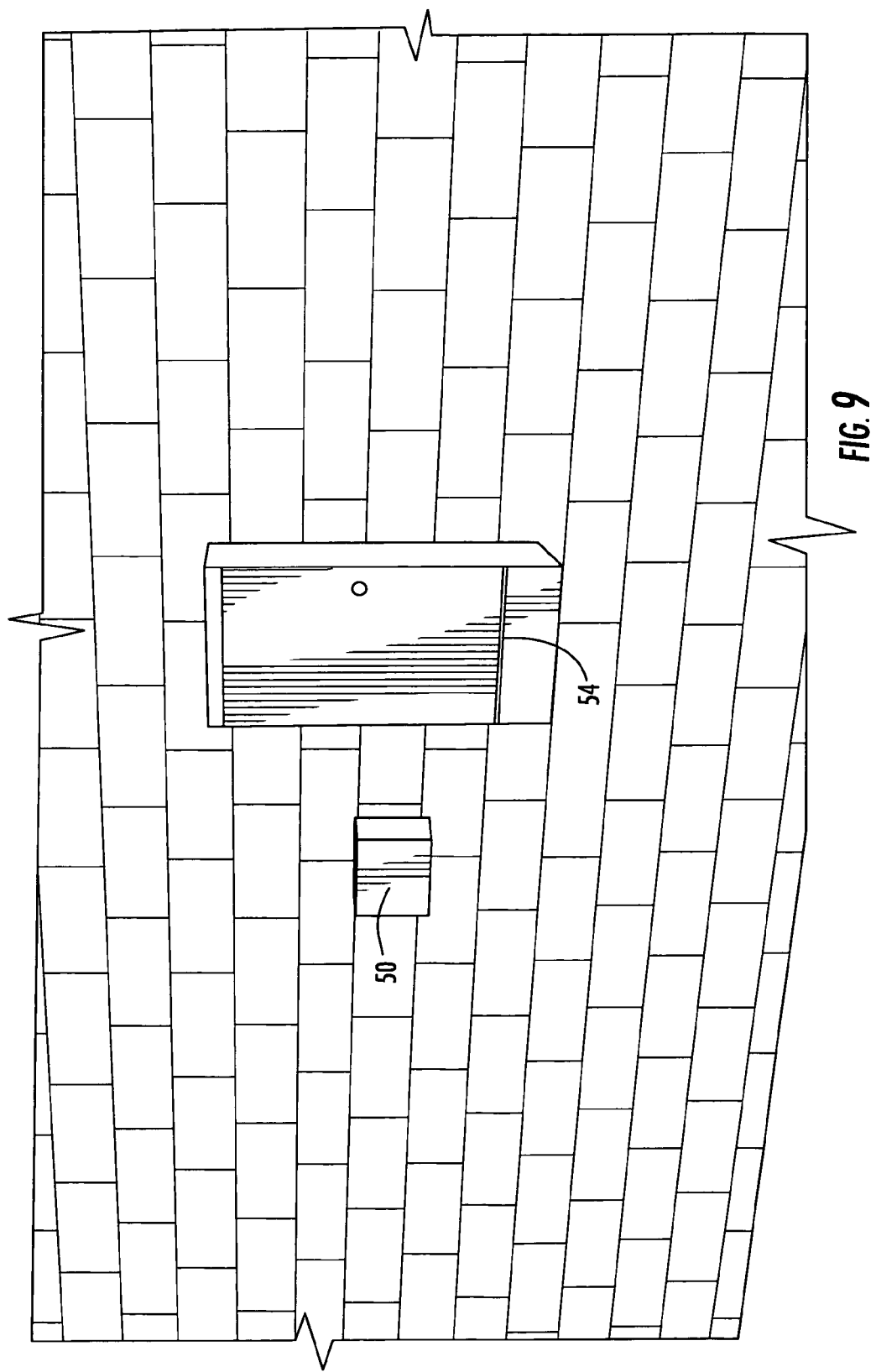
Figure 10A:
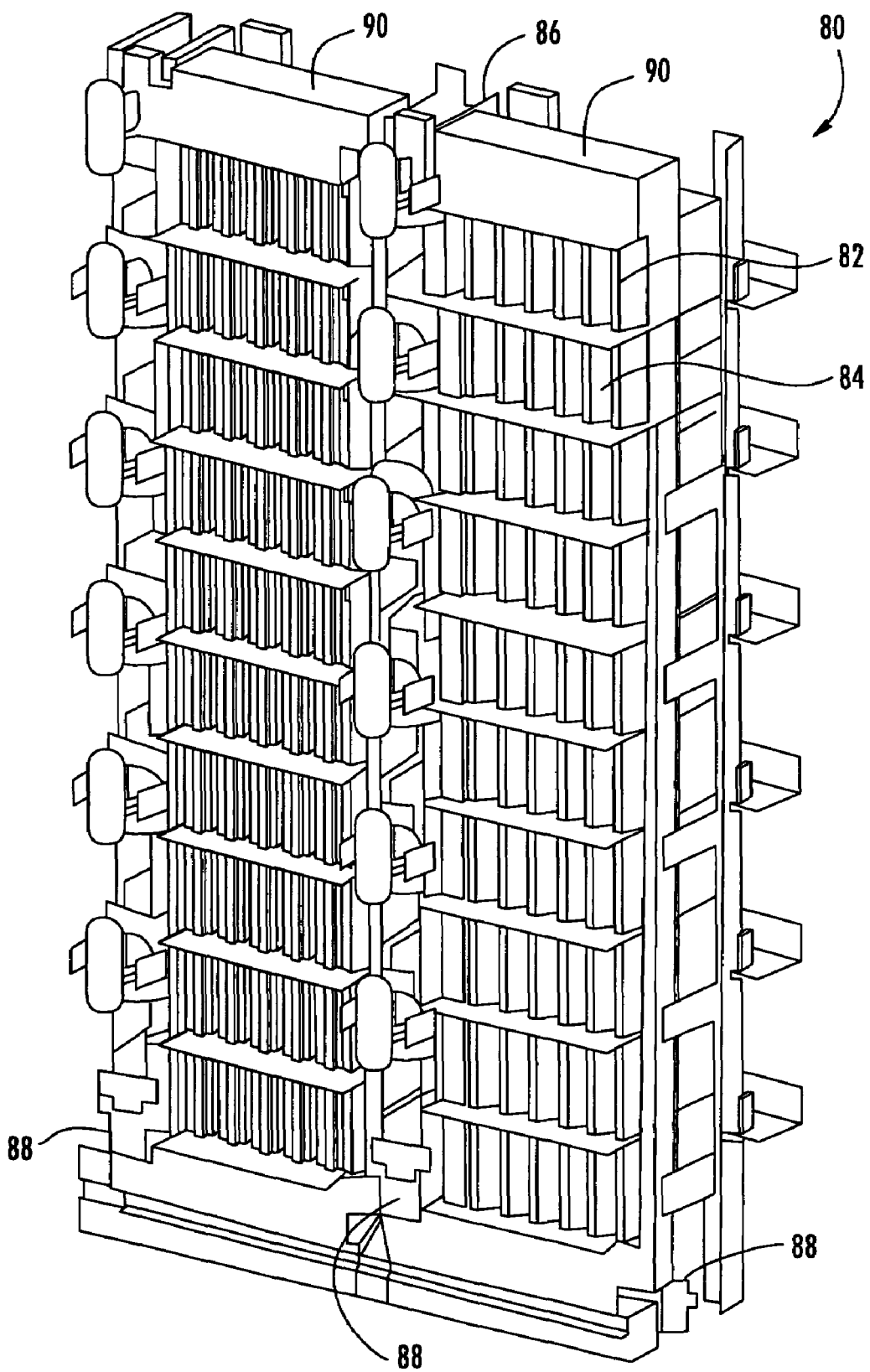
Figure 10B:
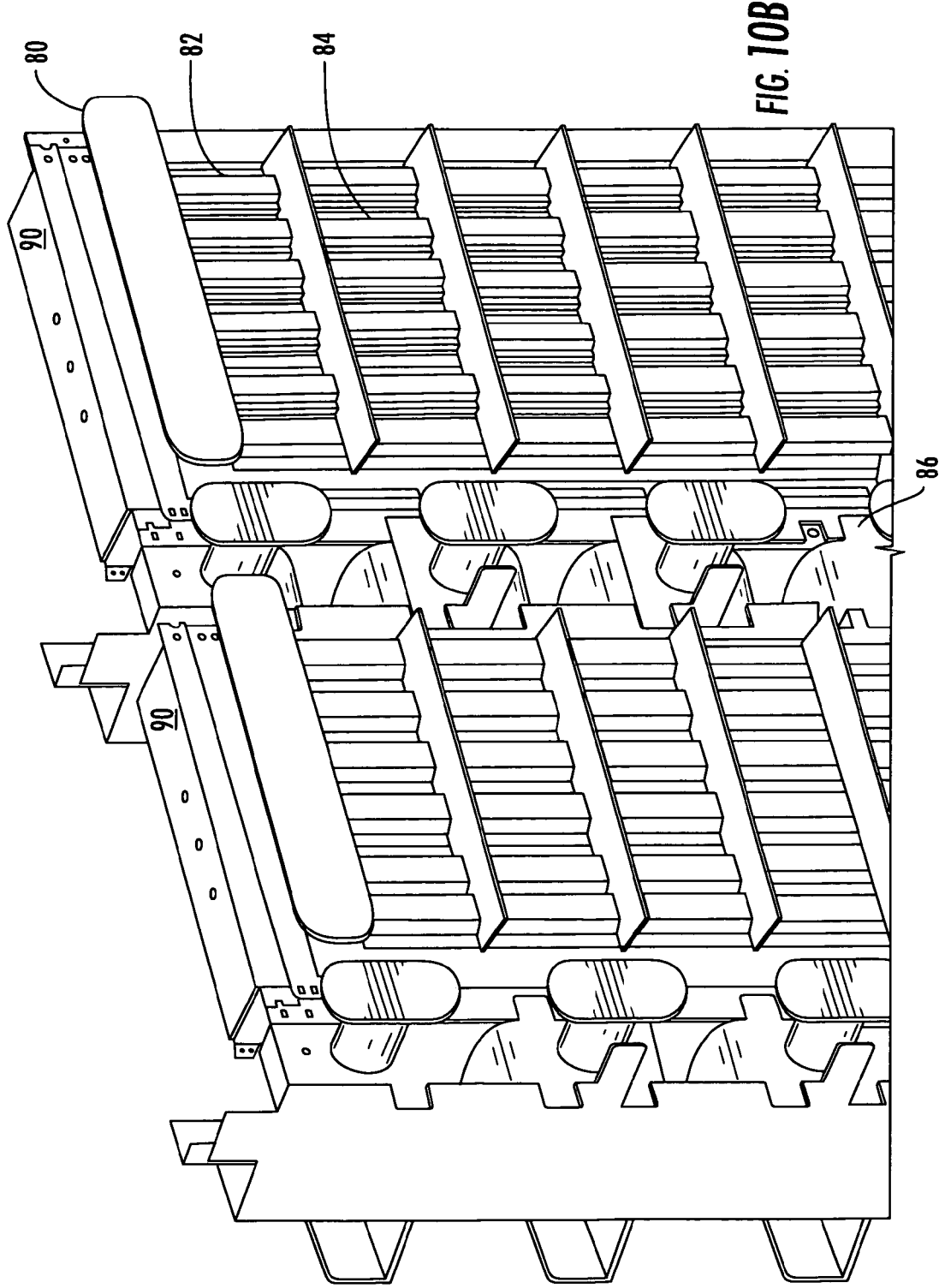
Figure 12:
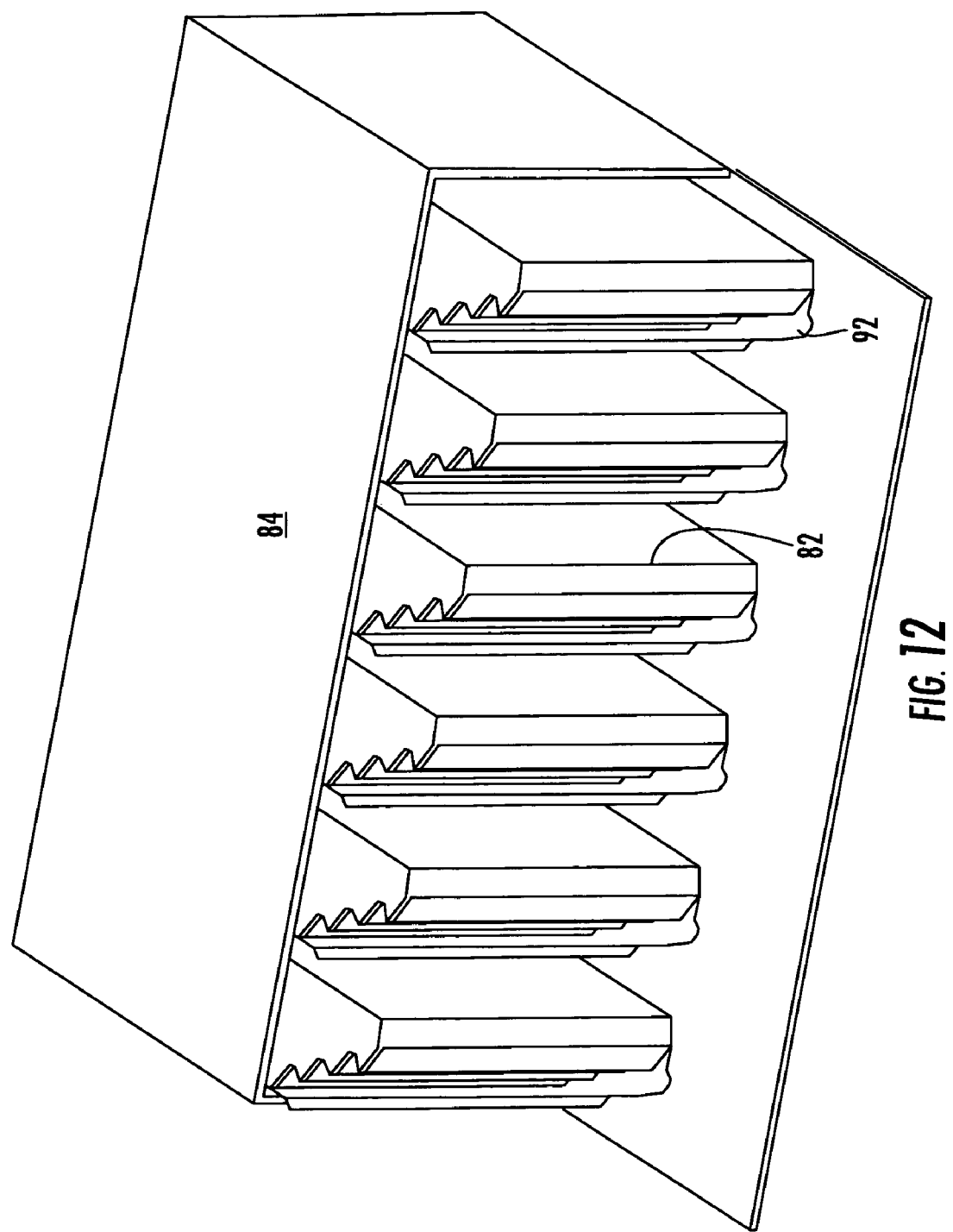
Figure 13:
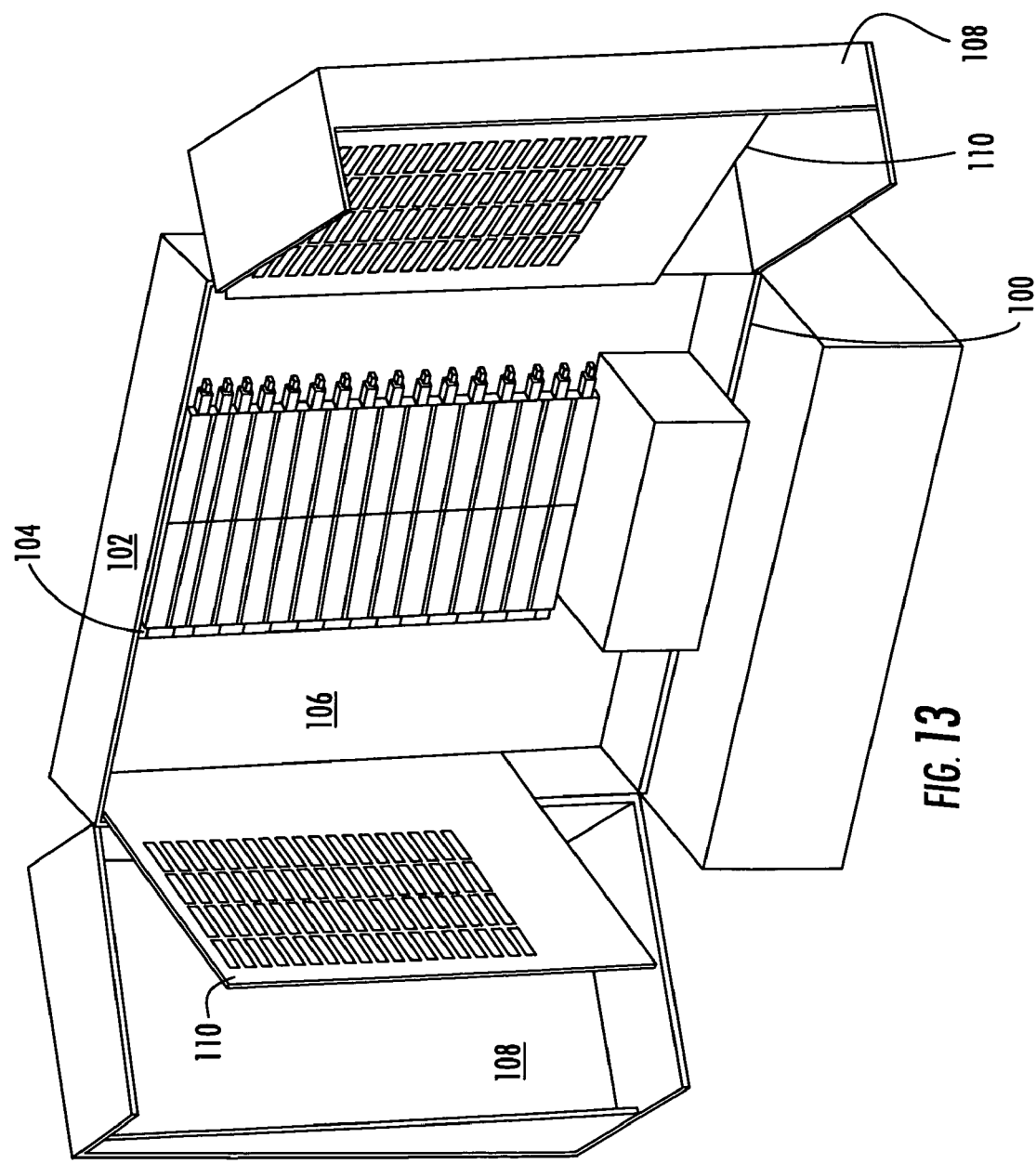
Figure 14:
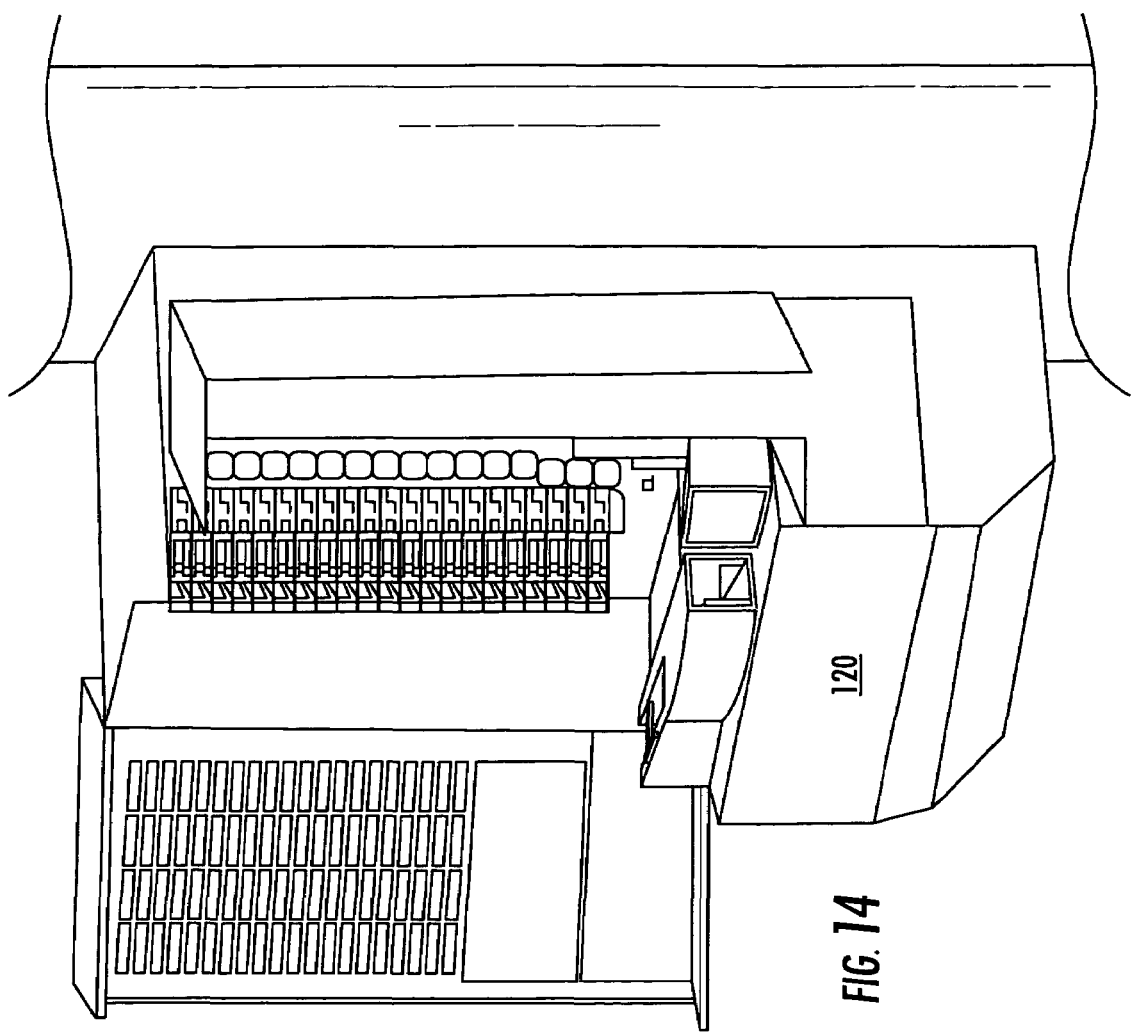
Figure 15:
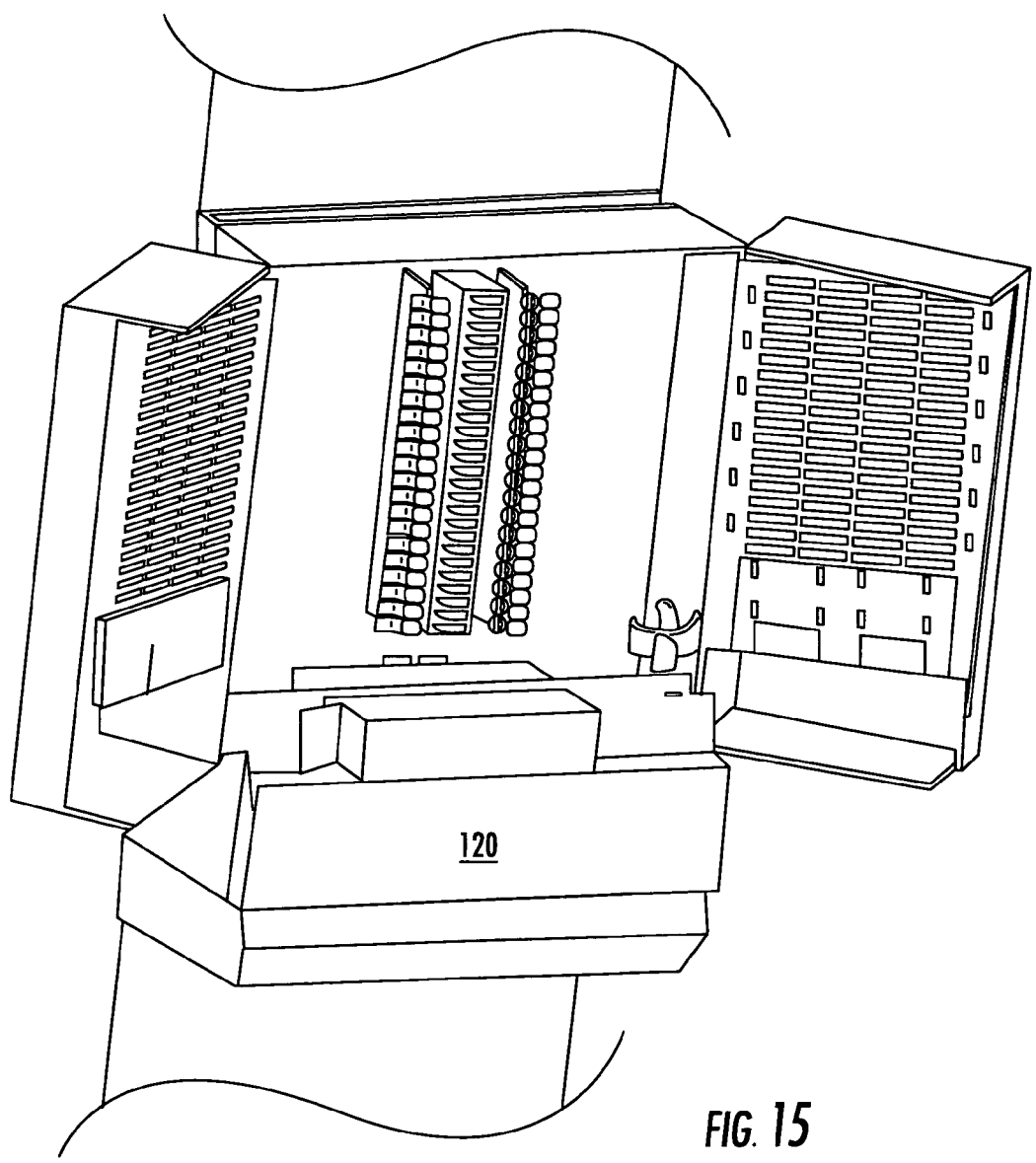
Figure 16:
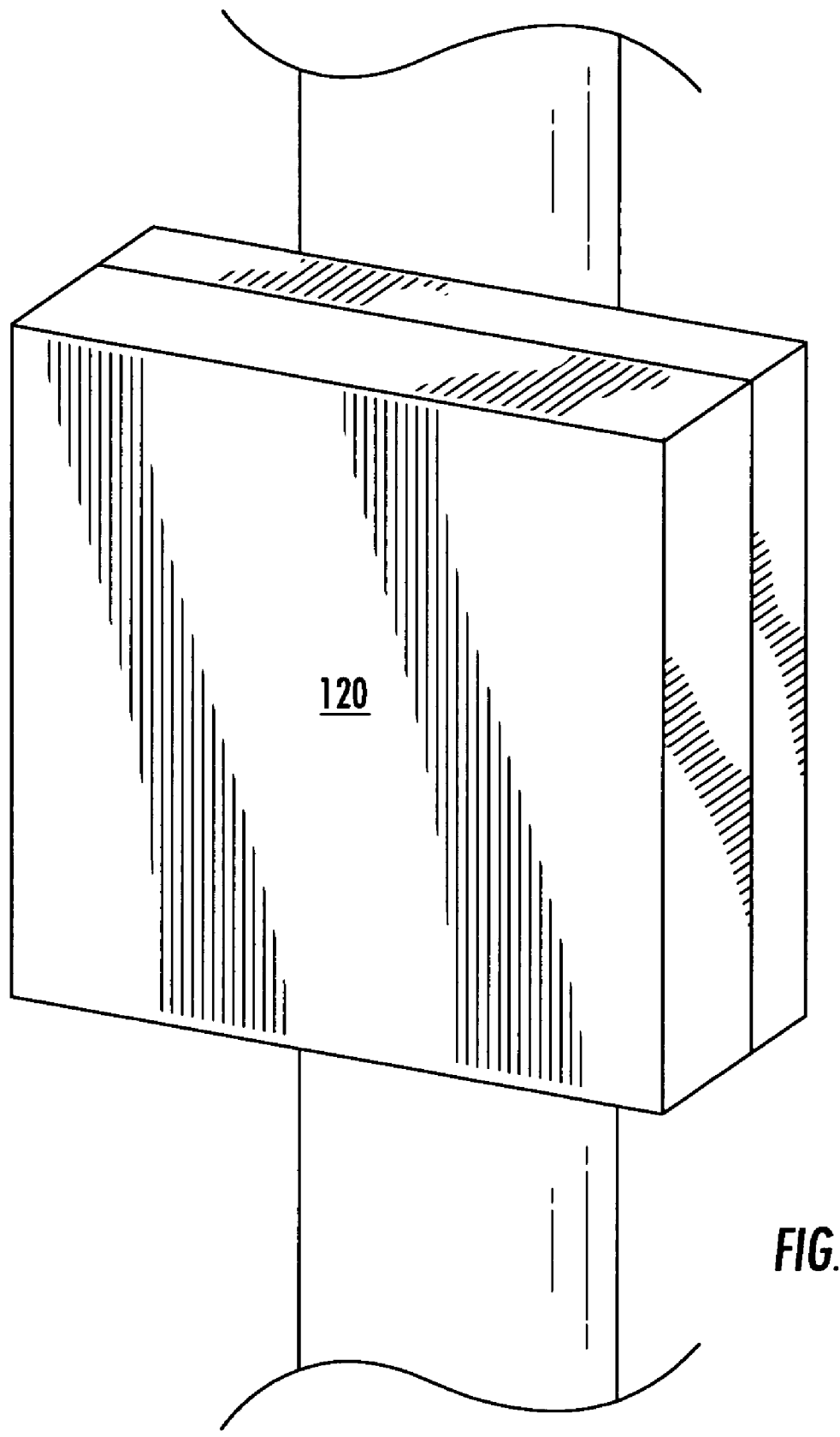
Figure 17:
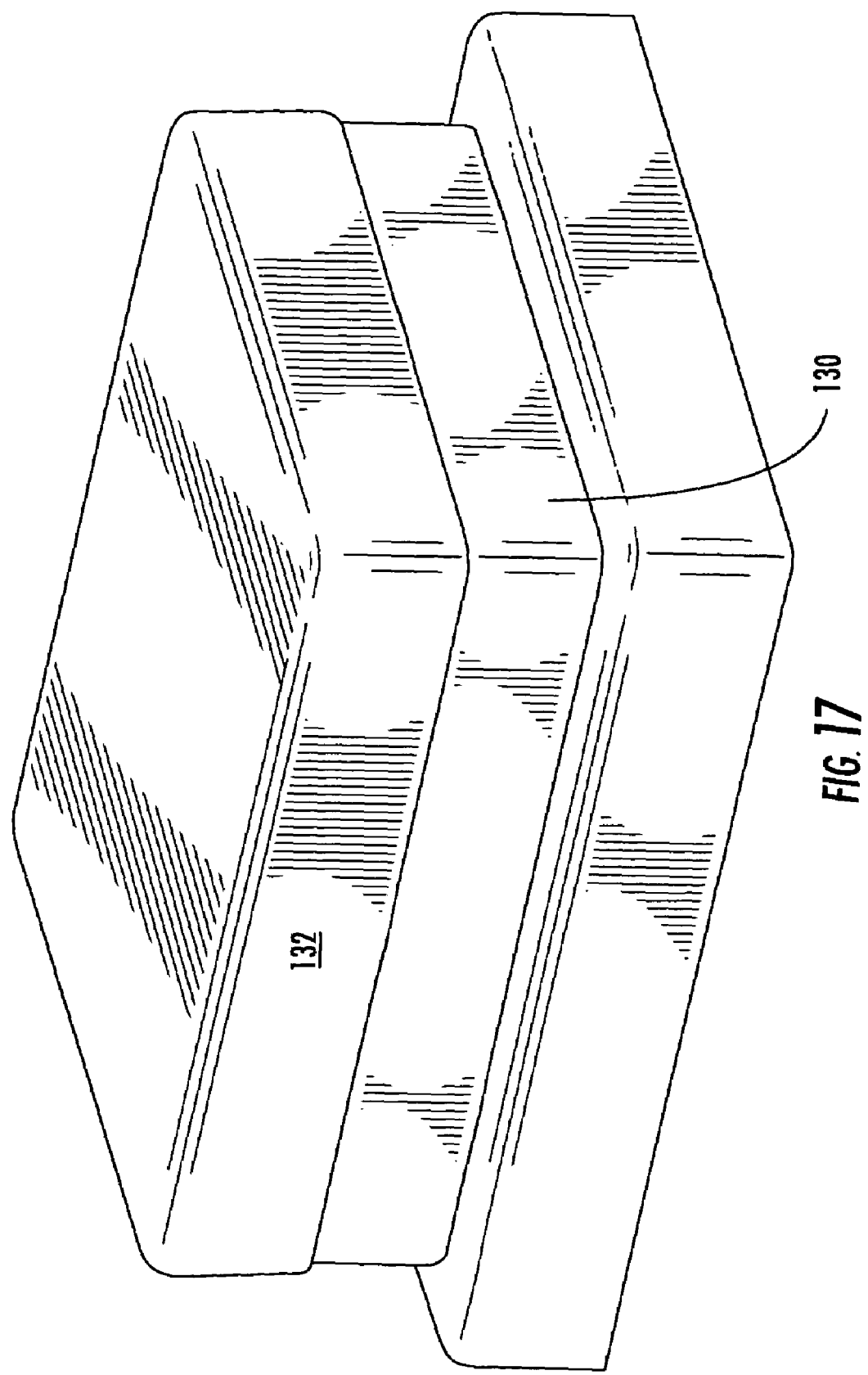
Figure 18:
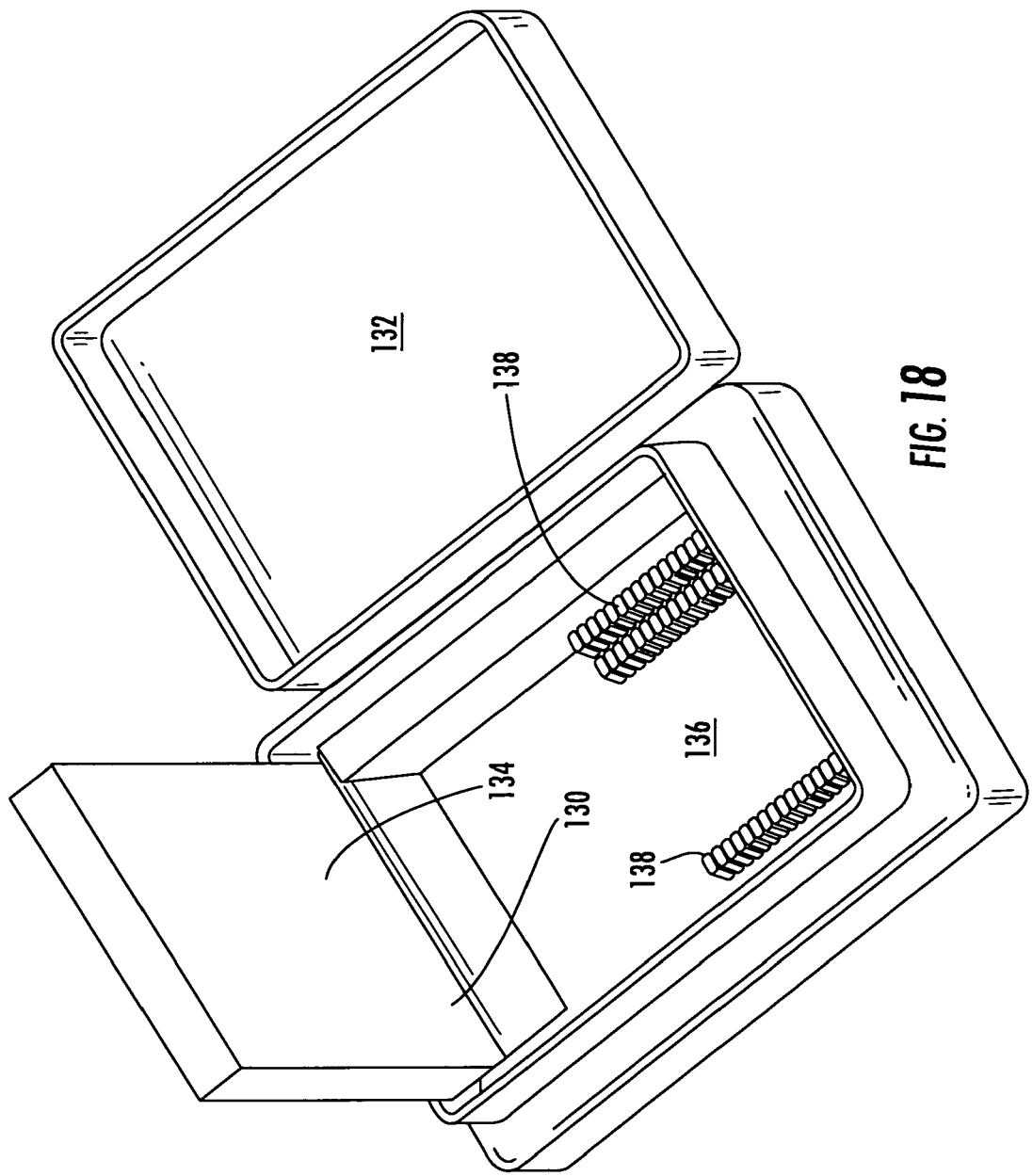
Figure 19:
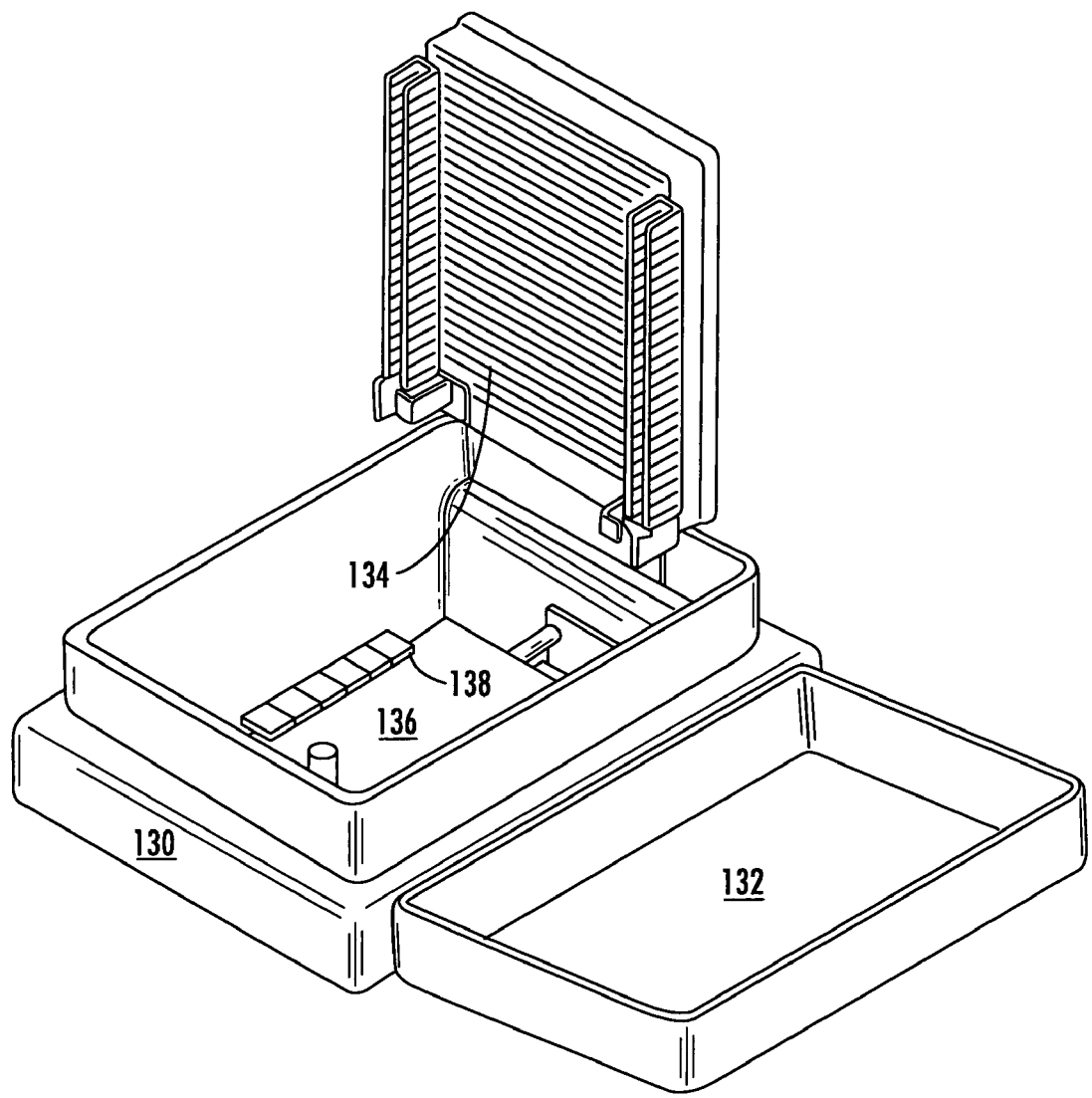
Figure 20:
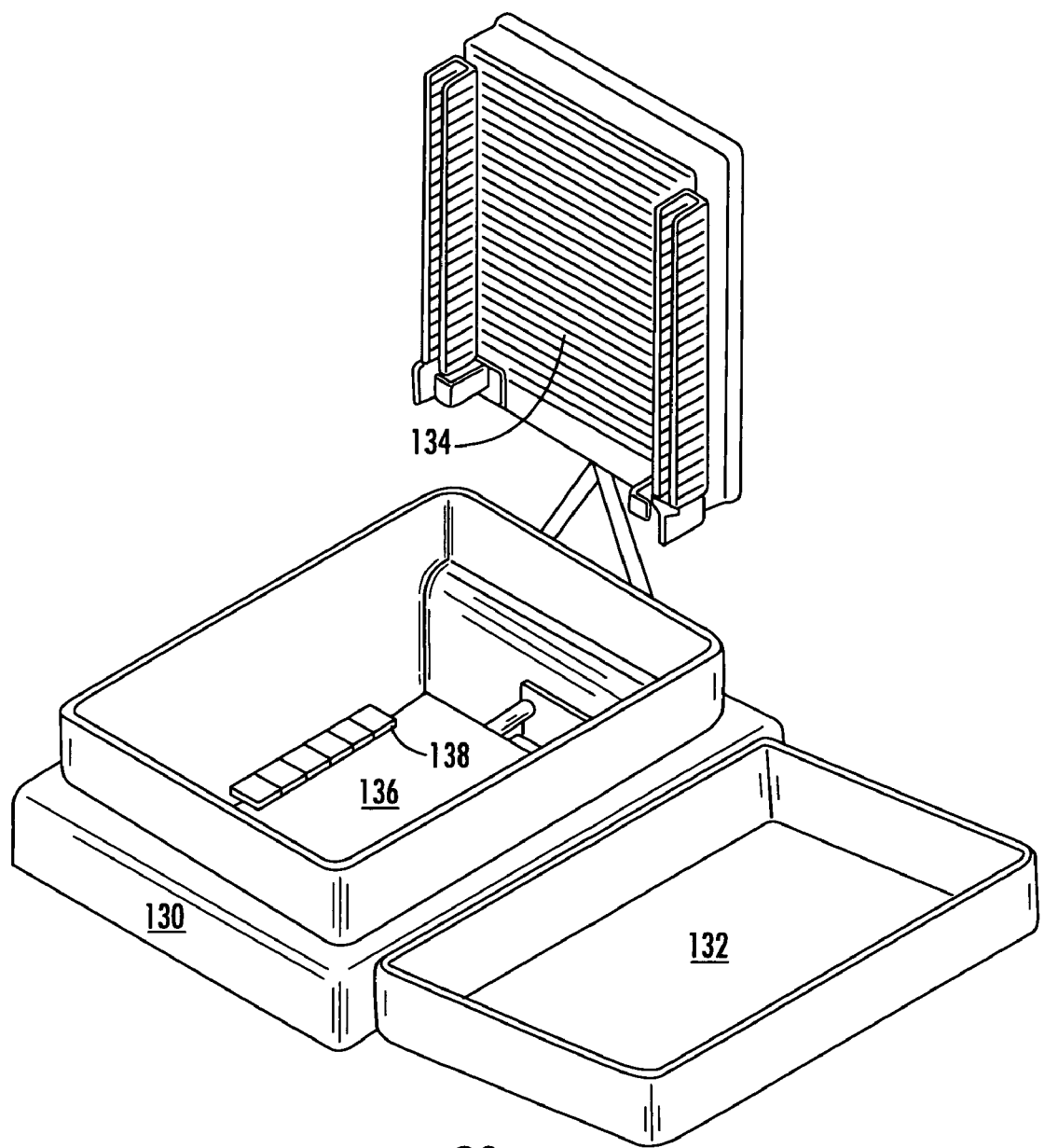

Having thus described the invention in general terms, reference will now be made to the accompanying drawings, which are not necessarily drawn to scale and are meant to be illustrative and not limiting, and wherein:

FIG. 1 is a schematic diagram illustrating a cross-section of a bend performance optical fiber operable in accordance with an exemplary embodiment of the present invention;

FIG. 2 is a cross-sectional image of a microstructured bend performance optical fiber illustrating an annular hole-containing region comprised of non-periodically disposed holes;

FIG. 3 is a perspective view, with a partial cut-away view, of a multi-port optical connection terminal in accordance with an embodiment of the present invention, wherein the cut-away view illustrates a stub cable slack storage compartment;

FIG. 4 is a perspective view of a multi-port optical connection terminal in accordance with another embodiment of the present invention having a stub cable slack storage compartment and a boot about the stub cable port;

FIG. 5 is a perspective view of a splitter module in accordance with yet another embodiment of the present invention, illustrating a plurality of splitter portions and multifiber adapters;

FIG. 6 is a perspective view of an optical connection terminal in accordance with a further embodiment of the present invention, illustrating a housing adapted to receive a plurality of the splitter modules of FIG. 5;

FIG. 7 is a perspective view of yet another optical connection terminal in accordance with a still further embodiment of the present invention, illustrating a housing adapted to receive a plurality of the splitter modules of FIG. 5 in an alternative configuration to FIG. 6;

FIG. 8 is a perspective view of the optical connection terminal of FIG. 6, illustrating the fiber optic network cables and the fiber optic subscriber cables connected to the splitter modules;

FIG. 9 is a perspective view of an optical connection terminal of the present invention along with a conventional optical connection terminal, wherein the terminals are adapted to interconnect an equivalent number of optical fiber cables;

FIGS. 10a and 10b are perspective views of a fiber optic equipment rack in accordance with another embodiment of the present invention, illustrating a plurality of subscriber termination modules selectively mounted to the fiber optic equipment rack;

FIG. 11 is an enlarged perspective view of a subscriber termination module of FIGS. 10a and 10b, illustrating a module comprising 72 optical connections between fiber optic subscriber cables and fiber optic network cables;

FIG. 12 is a perspective view of a housing of six subscriber termination modules of FIG. 11, illustrating a 432 fiber housing;

FIG. 13 is a perspective view of a pad-mounted fiber distribution hub in accordance with an embodiment of the present invention, illustrating the fiber distribution hub in an opened configuration;

FIG. 14 is a perspective view of a pole-mounted fiber distribution hub in accordance with another embodiment of the present invention, illustrating the fiber distribution hub in an opened configuration;

FIG. 15 is an additional perspective view of the pole-mounted fiber distribution hub of FIG. 14, illustrating the fiber distribution hub in an opened configuration;

FIG. 16 is a perspective view of the pole-mounted fiber distribution hub of FIG. 14, illustrating the fiber distribution hub in a closed configuration;

FIG. 17 is a perspective view of a surface-mounted fiber distribution hub in accordance with a further embodiment of the present invention, illustrating the fiber distribution hub in a closed configuration;

FIG. 18 is a top perspective view of the surface-mounted fiber distribution hub of FIG. 17, illustrating the fiber distribution hub in an open configuration;

FIG. 19 is a perspective view of the surface-mounted fiber distribution hub of FIG. 17, illustrating the fiber distribution hub in an open configuration; and FIG. 20 is a perspective view of the surface-mounted fiber distribution hub of FIG. 17, illustrating the fiber distribution hub in an open raised configuration.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although apparatus and methods for providing high density fiber optic hardware are described and shown in the accompanying drawings with regard to specific types of fiber optic hardware components, it is envisioned that the functionality of the various apparatus and methods may be applied to any now known or hereafter devised fiber optic hardware in which it is desired to provide a high density of fiber optic connections or other fiber management. Like numbers refer to like elements throughout.

With reference to FIGS. 3-20, various fiber optic hardware components in accordance with numerous embodiment of the present invention are illustrated. The illustrated embodiments of the fiber optic hardware components include multi-port optical connection terminals, optical connection terminals, fiber optic equipment racks and associated modules, splitter modules, and/or fiber distribution hubs; however it should be appreciated that the present invention is not limited to components having similar architectures nor to components providing comparable fiber optic network functionality. The present invention includes additional fiber optic components that incorporate the teachings and/or functionality of the embodiments disclosed herein. The embodiments disclosed herein are described using the bend performance optical fiber 1 of FIGS. 1 and 2; however it should be appreciated that further embodiments of the present invention are adapted to use alternative and additional optical fibers both currently known and to be developed.

FIG. 1 depicts a representation of a bend performance optical fiber 1 suitable for use in fiber optic cables, cables assemblies, fiber optic hardware, and other network components of the present invention. The present invention is advantageous because it permits assemblies having aggressive bending/installation solutions while optical attenuation remains extremely low. As shown, bend performance optical fiber 1 is a microstructured optical fiber having a core region and a cladding region surrounding the core region, the cladding region comprising an annular hole-containing region comprised of non-periodically disposed holes such that the optical fiber is capable of single mode transmission at one or more wavelengths in one or more operating wavelength ranges. The core region and cladding region provide improved bend resistance, and single mode operation at wavelengths preferably greater than or equal to 1500 nm, in some embodiments also greater than about 1310 nm, in other embodiments also greater than 1260 nm. The optical fibers provide a mode field at a wavelength of 1310 nm preferably greater than 8.0 microns, more preferably between about 8.0 and 10.0 microns. In preferred embodiments, optical fiber disclosed herein is thus single-mode transmission optical fiber.

In some embodiments, the microstructured optical fibers disclosed herein comprises a core region disposed about a longitudinal centerline and a cladding region surrounding the core region, the cladding region comprising an annular hole-containing region comprised of non-periodically disposed holes, wherein the annular hole-containing region has a maximum radial width of less than 12 microns, the annular hole-containing region has a regional void area percent of less than about 30 percent, and the non-periodically disposed holes have a mean diameter of less than 1550 nm.

By "non-periodically disposed" or "non-periodic distribution", it is meant that when one takes a cross-section (such as a cross-section perpendicular to the longitudinal axis) of the optical fiber, the non-periodically disposed holes are randomly or non-periodically distributed across a portion of the fiber. Similar cross sections taken at different points along the length of the fiber will reveal different cross-sectional hole patterns, i.e., various cross-sections will have different hole patterns, wherein the distributions of holes and sizes of holes do not match. That is, the holes are non-periodic, i.e., they are not periodically disposed within the fiber structure. These holes are stretched (elongated) along the length (i.e. in a direction generally parallel to the longitudinal axis) of the optical fiber, but do not extend the entire length of the entire fiber for typical lengths of transmission fiber.

For a variety of applications, it is desirable for the holes to be formed such that greater than about 95% of and preferably all of the holes exhibit a mean hole size in the cladding for the optical fiber which is less than 1550 nm, more preferably less than 775 nm, most preferably less than 390 nm. Likewise, it is preferable that the maximum diameter of the holes in the fiber be less than 7000 nm, more preferably less than 2000 nm, and even more preferably less than 1550 nm, and most preferably less than 775 nm. In some embodiments, the fibers disclosed herein have fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA.

The optical fibers disclosed herein may or may not include germania or fluorine to also adjust the refractive index of the core and or cladding of the optical fiber, but these dopants can also be avoided in the intermediate annular region and instead, the holes (in combination with any gas or gases that may be disposed within the holes) can be used to adjust the manner in which light is guided down the core of the fiber. The hole-containing region may consist of undoped (pure) silica, thereby completely avoiding the use of any dopants in the hole-containing region, to achieve a decreased refractive index, or the hole-containing region may comprise doped silica, e.g. fluorine-doped silica having a plurality of holes.

In one set of embodiments, the core region includes doped silica to provide a positive refractive index relative to pure silica, e.g. germania doped silica. The core region is preferably hole-free. As illustrated in FIG. 1, in some embodiments, the core region 170 comprises a single core segment having a positive maximum refractive index relative to pure silica $\Delta_1$ in %, and the single core segment extends from the centerline to a radius $R_1$. In one set of embodiments, 0.30% $<\Delta_1<$0.40%, and 3.0 µm$<R_1<$5.0 µm. In some embodiments, the single core segment has a refractive index profile with an alpha shape, where alpha is 6 or more, and in some embodiments alpha is 8 or more. In some embodiments, the inner annular hole-free region 182 extends from the core region to a radius $R_2$, wherein the inner annular hole-free region has a radial width W12, equal to R2-R1, and W12 is greater than 1 µm. Radius R2 is preferably greater than 5 µm, more preferably greater than 6 µm. The intermediate annular hole-containing region 184 extends radially outward from R2 to radius R3 and has a radial width W23, equal to R3-R2. The outer annular region 186 extends radially outward from R3 to radius R4. Radius R4 is the outermost radius of the silica portion of the optical fiber. One or more coatings may be applied to the external surface of the silica portion of the optical fiber, starting at R4, the outermost diameter or outermost periphery of the glass part of the fiber. The core region 170 and the cladding region 180 are preferably comprised of silica. The core region 170 is preferably silica doped with one or more dopants. Preferably, the core region 170 is hole-free. The hole-containing region 184 has an inner radius R2 which is not more than 20 µm. In some embodiments, R2 is not less than 10 µm and not greater than 20 µm. In other embodiments, R2 is not less than 10 µm and not greater than 18 µm. In other embodiments, R2 is not less than 10 µm and not greater than 14 µm. Again, while not being limited to any particular width, the hole-containing region 184 has a radial width W23 which is not less than 0.5 µm. In some embodiments, W23 is not less than 0.5 µm and not greater than 20 µm. In other embodiments, W23 is not less than 2 µm and not greater than 12 µm. In other embodiments, W23 is not less than 2 µm and not greater than 10 µm.

Such fiber can be made to exhibit a fiber cutoff of less than 1400 nm, more preferably less than 1310 nm, a 20 mm macrobend induced loss at 1550 nm of less than 1 dB/turn, preferably less than 0.5 dB/turn, even more preferably less than 0.1 dB/turn, still more preferably less than 0.05 dB/turn, yet more preferably less than 0.03 dB/turn, and even still more preferably less than 0.02 dB/turn, a 12 mm macrobend induced loss at 1550 nm of less than 5 dB/turn, preferably less than 1 dB/turn, more preferably less than 0.5 dB/turn, even more preferably less than 0.2 dB/turn, still more preferably less than 0.01 dB/turn, still even more preferably less than 0.05 dB/turn, and a 8 mm macrobend induced loss at 1550 nm of less than 5 dB/turn, preferably less than 1 dB/turn, more preferably less than 0.5 dB/turn, and even more preferably less than 0.2 dB-turn, and still even more preferably less than 0.1 dB/turn.

An example of a suitable fiber is illustrated in FIG. 2. The fiber in FIG. 2 comprises a core region that is surrounded by a cladding region that comprises randomly disposed voids which are contained within an annular region spaced from the core and positioned to be effective to guide light along the core region. Other optical fibers and microstructured fibers may be used in the present invention. Additional features of the microstructured optical fibers of additional embodiments of the present invention are described more fully in pending U.S. patent application Ser. No. 11/583,098 filed Oct. 18, 2006, and provisional U.S. patent application Ser. No. 60/817,863 filed Jun. 30, 2006; 60/817,721 filed Jun. 30, 2006; 60/841,458 filed Aug. 31, 2006; and 60/841,490 filed Aug. 31, 2006; all of which are assigned to Corning Incorporated and the disclosures of which are incorporated by reference herein.

Optical fiber cables of the present invention allow aggressive bending such as for installation, slack storage, and the like while inhibiting a bend radii that allows damage and/or breaks the optical fiber. Use of such bend performance optical fiber enables the fibers to undergo a minimum bend radius while providing desired optical performance. Certain fiber optic hardware components of various embodiments of the present invention include optical fiber routing guides to provide fiber routing and/or slack storage for the optical fiber, as described more fully below. Accordingly, some embodiments of the present invention comprise optical fiber routing guides that define a bend radius of between about 0.01 inch to about 1.0 inch (one inch), more preferably between about 0.1 inch and 0.5 inch (half an inch), and still more preferably of about 0.2 inch. The optical fiber routing guides of some embodiments of the present invention do not define a curved routing guide, but do provide for the minimum bend radius of the particular optical fiber.

Turning now to the fiber optic hardware and related hardware components of FIGS. 3-20, the illustrated embodiments are adapted to accommodate the microstructured optical fibers described above. FIGS. 3 and 4 illustrate multi-port optical connection terminals in accordance with two embodiments of the present invention. FIG. 3 illustrates a multi-port optical connection terminal 10, which in some embodiments is substantially similar to the multi-port optical connection terminals described in U.S. Pat. No. 7,120,347 issued Oct. 10, 2006 and assigned to the present assignee, the disclosure of which is hereby incorporated by reference. The multi-port optical connection terminal 10 of FIG. 3 includes a stub cable 12 that enters an internal cavity 14 of the housing 16 through a stub cable port 18. The stub cable 12 is preferably in optical communication with the fiber optic distribution cable. The housing 16 may include a number of angled surfaces 20 onto which connector ports (not shown) may be provided to allow connection of pre-connectorized drop cables (not shown) or the like. Turning again to the stub cable 12, some conventional multi-port optical connection terminals provide slack storage for the individual fibers within the interior cavity of the multi-port optical connection terminal; however, the multi-port optical connection terminal 10 of FIG. 3 provides a stub cable slack storage compartment 22 defined within the interior cavity 14 of the housing 16, wherein supplementary length 24 of the stub cable 12 is selectively retractable from the stub cable slack storage compartment. The supplementary length 24 of the stub cable 12 of the embodiment of FIG. 3 is stored in a plurality of figure-eight formations that define axes that are generally parallel to the axis of the entering stub cable; however, further embodiments of the present invention provide slack storage for the supplementary length of the stub cable in additional and/or alternative fashions. One advantage of the present invention is the multi-port optical connection terminals provide stub cable slack storage, which enables technicians to position the terminal at a wider range of locations based upon the ability to retract the stub cable (which is not provided by conventional multi-port optical connection terminals), while providing a generally equivalent footprint (surface area of the bottom surface) as conventional multi-port optical connection terminals.

Turning now to the multi-port optical connection terminal 30 of FIG. 4, the terminal is illustrated without the cut-away view of FIG. 3 and illustrates the plurality of connector ports 32 provided on an exterior wall 34 of the housing. The connector ports 32 are preferably adapted to receive at least one fiber optic connector of an optic fiber in optical communication with the stub cable from inside the terminal and a connectorized end of a fiber optic drop cable (not shown) from outside the terminal another embodiment. The multi-port optical connection terminal 30 of FIG. 4 illustrates a boot 36 that defines the stub cable port 38, such that the supplementary length of the stub cable may be selectively retracted from the multi-port optical connection terminal 30 and/or to selectively insert (such that the stub cable slack storage compartment receives) the retracted supplementary length of the stub cable. Therefore, various embodiments of the present invention provide multi-port optical connection terminals that provide technicians with the ability to place the terminals in additional locations compared to conventional terminals having a stub cable of fixed length.

Turning now to the optical connection terminal 50 and the associated splitter module 52 illustrated in FIGS. 5-9, the optical connection terminal is shown as being mounted to a wall (in FIG. 9 the optical connection terminal 50 is shown with a conventional optical connection terminal 54 to illustrate the significant size difference achieved by the present invention); however, further embodiments of the optical connection terminals of the present invention may be mounted in any location, including but not limited to pedestals, cabinets, and the like, and may be referred to by alternative names, including local convergence points (LCPs), fiber distribution hubs (FDHs), or the like. The optical connection terminal 50 of the illustrated embodiment includes a plurality of splitter modules 52, and the splitter modules include a plurality of splitter portions 56 and multifiber adapters 58 and 60. The multifiber adapter 58 of the splitter module 52 is adapted to selectively receive a connector of a fiber optic network cable 62 (shown in FIG. 8), and the multifiber adapter 60 of the splitter module 52 is adapted to selectively receive a connector of a fiber optic subscriber cable 64 (also shown in FIG. 8).

Although multifiber components are described in the illustrated embodiment, it should be appreciated that the present invention also includes terminals adapted for use with single fiber components. The fiber optic network cable 62 of the optical connection terminal 50 of FIG. 8 is routed through a first opening 66 of the housing 68 of the terminal defining an exterior wall 70 and an interior cavity 72. The interior cavity 72 is selectively accessible through a moveable wall portion 74 to enable a technician to route the cables and/or connect the cables to the appropriate adapters. The fiber optic subscriber cable 64 is routed through a second opening 76 from the interior cavity 72 to outside the housing 68 and ultimately to a subscriber location. The fiber optic subscriber cable 64 is a multifiber cable, such as a cable with eight single fibers that may service two, four, or eight customers to give non-limiting examples.

Based in part upon the use of the microstructured optical fibers of the present invention, certain embodiments of the optical connection terminals 50 are adapted to define a density of fiber optic subscriber fibers to unit volume of the interior cavity 72 of at least 50 fibers/ft$^3$. More preferably, additional embodiments of the present invention define a density of fiber optic subscriber fibers to unit volume of the interior cavity of at least 75 fibers/ft$^3$. Still more preferably, further embodiments define a density of fiber optic subscriber fibers to unit volume of the interior cavity of at least 100 fibers/ft$^3$. The optical connection terminal 50 of FIGS. 5-9, with an outside dimension of approximately 33 inches in height, by 18.5 inches in width, and 13.5 inches in depth and 432 subscriber fibers defines a density of fiber optic subscriber fibers to unit volume of the interior cavity of approximately 90 fibers/ft$^3$. The present invention thus provides a significant improvement over the prior art optical connection terminals, such as terminal 54 of FIG. 9. More specifically, the optical connection terminal 54 has outside dimensions of approximately 41 inches in height, by 27.5 inches in width, and 18 inches in depth and 432 subscriber fibers defines a density of fiber optic subscriber fibers to unit volume of the interior cavity of approximately 37 fibers/ft$^3$. Therefore, the optical connection terminals of the present invention provide a significant and novel improvement over prior art optical connection terminals.

Turning now to the fiber optic equipment rack 80 of FIGS. 10*a* and 10*b*, as well as the associated subscriber termination module 82 of FIG. 11 and collection 84 of subscriber termination modules 82 of FIG. 12, the present invention also provides a fiber optic equipment rack for interconnecting optical fibers of one or more fiber optic subscriber cables with a fiber optic network cable in an indoor environment. The fiber optic equipment rack 80 comprises a frame 86 comprising three vertical supports 88 and horizontal supports 90 joined therebetween. At least one subscriber termination module 82 is selectively mounted to the frame by standard mounting devices, including but not limited to fasteners, retaining tabs, and the like. The subscriber termination module 82 for selective optical connection of one or more fiber optic subscriber cables (not shown), typically routed to the rear of the module, with one or more fiber optic network cables (not shown), typically routed to the front of the module, at a subscriber termination 92. The subscriber termination 92 typically comprises an adapter to selectively connect the connectors of the fiber optic subscriber cables with the connectors of the fiber optic network cables.

Based in part upon the optical fibers used in conventional fiber optic equipment racks, such conventional fiber optic equipment racks typically accommodate either 720 subscriber terminations or 1,440 subscriber terminations (total number of terminations in an equipment frame fully populated with subscriber termination modules). These conventional fiber optic equipment frames, like the fiber optic equipment frame 80 of FIGS. 10*a* and 10*b*, define a volume of 35 ft$^3$ with a height of 84 inches, a width of 30 inches, and a depth of 24 inches. However, based in part upon the use of microstructured optical fiber or other bend performance optical fiber, the fiber optic equipment frame 80 of FIGS. 10*a* and 10*b* is adapted to accommodate 4,320 subscriber terminations. Therefore, the fiber optic equipment racks, and their associated subscriber termination modules define a density of subscriber terminations to unit of volume of the subscriber termination module of approximately 21 terminations/ft$^3$ (for the 720 termination racks) or approximately 41 terminations/ft$^3$ (for the 1,440 termination racks). However, the fiber optic equipment racks of the present invention include subscriber termination modules 82 that define a density of subscriber terminations to unit of volume of the subscriber termination module of at least 80 terminations/ft$^3$, or more preferably at least 100 terminations/ft$^3$, or still more preferably at least 120 terminations/ft$^3$. The fiber optic equipment rack 80 of the illustrated embodiments with 4,320 subscriber terminations comprises subscriber termination modules 82 that define a density of subscriber terminations to unit of volume of the subscriber termination module of approximately 123 terminations/ft$^3$. Still further embodiments of the fiber optic equipment racks of the present invention define alternative shapes, dimensions, and or densities of terminations.

Turning now to the subscriber termination modules 82 of FIG. 11 and the collection 84 of subscriber termination modules 82 of FIG. 12, the modules comprise four rows of eighteen terminations to comprise a total of 72 terminations. The collection 84 of six modules 82 thus comprises a total of 432 terminations. Further modules and/or collections may define alternative numbers of terminations, but do provide a density of subscriber terminations to unit of volume of the subscriber termination module of significantly greater than the conventional 41 terminations/ft$^3$. The subscriber termination module 82 of FIGS. 11 and 12 provides an angled connection surface 94 for the selective optical connections of the one or more fiber optic subscriber cables and the one or more fiber optic network cables, wherein the connection surfaces are angled relative to a front face of the frame defined by the vertical supports and horizontal support.

The present invention also provides a number of different fiber distribution hubs (FDHs) that also provide a significant improvement in the density of subscriber terminations per unit volume. Although the embodiments described hereafter with respect to FIGS. 13-20 are called FDHs, it should be understood that these FDHs also encompass optical connection terminals, local convergence points (LCPs), or the like which all provide for the interconnecting of optical fibers of a fiber optic network cable with one or more fiber optic subscriber cables. Referring now to the FDH 100 of FIG. 13, a pad-mounted FDH is disclosed that accommodates microstructured optical fiber or other bend performance optical fiber. The FDH 100 comprises a housing 102 defining an exterior wall 104 and an interior cavity 106. The interior cavity 106 is selectively accessible through at least one moveable wall portion 108 which comprises a front door in the FDH 100 of FIG. 13. The FDH 100 further comprises at least one opening through the exterior wall for the ingress and egress of the one or more fiber optic subscriber cables and one or more fiber optic network cables. The FDH 100 also includes at least one splitter module within the interior cavity 106 to split the optical signal of at least one fiber optic network cable to a plurality of network pigtails. The FDH 100 also comprises at least one subscriber termination field mounted within the housing and adapted to selectively optically connect the network pigtails to the fiber optic subscriber cables at subscriber terminations. In some embodiments of the present invention, the FDH includes a swing frame 110 within the interior cavity of the housing, wherein at least one of the at least one splitter module and the at least one subscriber termination field is mounted to the swing frame. An example of a conventional FDH having comparable components is provided in U.S. patent application Ser. No. 11/197,213 filed Aug. 4, 2005 and assigned to the present assignee, the disclosure of which is hereby incorporated by reference.

Whereas conventional FDHs adapted to provide 432, 864, or any number of subscriber terminations are often rather large, difficult to transport, and/or are fairly noticeable by the general public, the FDH 100 of the present invention provides a comparable number of subscriber terminations with a significantly smaller housing 102. For example, a conventional FDH with 864 subscriber terminations defines a volume of 13.66 ft$^3$ with a height of 41 inches, a width of 36 inches, and a depth of 16 inches. Therefore, the conventional FDH defines a density of subscriber terminations to unit of volume of the housing of approximately 63 terminations/ft$^3$. However, based in part upon the use of microstructured optical fiber or other bend performance optical fiber, the FDH 100 of FIG. 13 is adapted to accommodate 864 subscriber terminations while defining a volume of 4.61 ft$^3$ with a height of 30 inches, a width of 24 inches, and a depth of 10 inches. Therefore, the FDH 100 defines a density of subscriber terminations to unit of volume of the housing of approximately 187 terminations/ft$^3$. Therefore, the FDHs of the present invention, define a density of subscriber terminations to unit of volume of the housing of at least 100 terminations/ft$^3$, and preferably a density of subscriber terminations to unit of volume of the housing of at least 150 terminations/ft$^3$. The dimensions provided above do not include the skirt of the housing of the FDH. In addition, further embodiments of the present invention include FDHs with alternative shapes and sizes that also provide the desired density of subscriber terminations to unit of volume of the housing.

Whereas the FDH 100 of FIG. 13 is mounted to a pad, the FDH 120 of FIGS. 14-16 is mounted to a pole. Although conventional FDHs, such as those described above, are too large to mounted to a pole and remain aesthetically pleasing and/or less noticeable, the high density of subscriber terminations to unit volume of the housing provided by the present invention enable FDHs to be mounted on poles and provide the desired interconnectivity without the undesirable large size of conventional FDHs. Also, by mounting the FDH on a pole, installation and/or maintenance can be made more convenient, for example by not requiring additional easements to install the pad-mounted FDH, minimizing likelihood of damage to the FDH by accidents, vandalism, infestation, or the like, and/or providing increased access (particularly through the bottom) to the FDH. The FDH 120 of FIGS. 14-16 includes an architecture comparable to the FDH 100 of FIG. 13; however, further embodiments of the present invention comprise alternative designs in order to adapt the FDH for pole-mounting, such as providing a different size and/or shape to facilitate mounting and/or to make the FDH less noticeable to the general public.

FIGS. 17-20 illustrate yet another FDH 130 in accordance with additional embodiments of the present invention. The surface-mounted FDH 130 is more desirable than pad-mounted FDHs (such as FDH 100 of FIG. 13) in certain situations in which it is desired to minimize the visibility of the FDH and/or to minimize the likelihood of damage to the FDH. Because of the high density fiber optic interconnectivity provided by the present invention, such surface-mounted FDHs which were previously not feasible due to the large size are now possible in part because of the small volumes required by the FDHs of the present invention. In FIG. 17 the FDH 130 is illustrated in the closed position, and in FIGS. 18-20 the FDH is illustrated in the opened position. Although further embodiments of the present invention define alternative opened and closed positions, the FDH 130 of the illustrated embodiment is opened by swinging up and over a top panel 132 and then pivoting upwards approximately 90 degrees a subscriber termination field 134. FIG. 20 illustrates the subscriber termination field 134 raised an additional amount by telescoping the termination field upward using linkages or other comparable devices. In a base 136 of the FDH is included one or more splitter modules 138 into which the optical signal of the fiber optic network cable is split into a plurality of network pigtails (now shown). These network pigtails may be selectively connected to the front of the subscriber terminations of the termination field 134 by a technician. The fiber optic subscriber cables are preferably connected to the back of the subscriber terminations, such that selectively connecting the network pigtail to the front of the subscriber terminations provides network access to the particular customer in some embodiments of the present invention. The FDH 130 may be converted from the opened position to the closed position in generally the opposite order described above, and such conversion between the opened and closed positions preferably does not cause any of the fiber optic connections to become unintentionally disconnected or otherwise adversely affect the optical connectivity provided by the FDH.

The FDH 130 of the illustrated embodiment defines a volume of 3.27 ft$^3$ with a height of 6.25 inches, a width of 35.50 inches, and a depth of 25.50 inches. The FDH 130 also accommodates 864 subscriber terminations. Therefore, the surface-mounted FDH 130 defines a density of subscriber terminations to unit of volume of the housing of approximately 265 terminations/ft$^3$. This density is significantly higher than the conventional FDHs described above with densities of subscriber terminations to unit of volume of the housing of approximately 63 terminations/ft$^3$. In addition, further embodiments of the present invention include additional surface-mounted FDHs with alternative shapes and sizes that also provide the desired density of subscriber terminations to unit of volume of the housing while maintaining the low profile (in the closed position) desired by the craft.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

That which is claimed:

1. A multi-port optical connection terminal for interconnecting optical fibers of one or more fiber optic drop cables with a fiber optic distribution cable, the multi-port terminal comprising:

a housing defining an exterior wall and an interior cavity;

a stub cable in optical communication with the fiber optic distribution cable;

a stub cable port provided in the exterior wall of the housing through which the stub cable passes into the interior cavity of the housing;

a plurality of connector ports provided on the exterior wall of the housing, wherein the connector ports are adapted to receive at least one fiber optic connector of an optic fiber in optical communication with the stub cable from inside the terminal and a connectorized end of a fiber optic drop cable from outside the terminal; and a stub cable slack storage compartment defined within the interior cavity of the housing, wherein supplementary length of the stub cable is selectively retractable from the stub cable slack storage compartment.

2. A multi-port terminal according to claim 1, wherein the excess length of the stub cable is generally stored in a plurality of figure-eight formations within the stub cable slack storage compartment.

3. A multi-port terminal according to claim 1, wherein the stub cable slack storage compartment is adapted to selectively receive retracted supplementary length of the stub cable.

4. A multi-port terminal according to claim 1, wherein the optical fiber of at least the stub cable comprises a microstructured optical fiber comprising a core region and a cladding region surrounding the core region, the cladding region comprising an annular hole-containing region comprised of non-periodically disposed holes.

5. A multi-port terminal according to claim 4, wherein the microstructured fiber has an 8 mm macrobend induced loss at 1550 nm of less than 0.2 dB/turn.

6. An optical connection terminal for interconnecting optical fibers of one or more fiber optic subscriber cables with a fiber optic network cable, the terminal comprising:

a housing defining an exterior wall and an interior cavity, wherein the interior cavity is selectively accessible through at least one moveable wall portion;

at least one opening through the exterior wall for the ingress and egress of the one or more fiber optic subscriber cables and one or more fiber optic network cables; and at least one splitter module within the interior cavity to split the optical signal of at least one fiber optic network cable to at least two fiber optic subscriber cables, wherein the fiber optic subscriber cables comprise subscriber fibers;

wherein the housing is adapted to define a density of subscriber fibers to unit of volume of the interior cavity of at least 50 fibers/ft$^3$.

7. A terminal according to claim 6, wherein the housing is adapted to define a density of subscriber fibers to unit of volume of the interior cavity of at least 75 fibers/ft$^3$.

8. A terminal according to claim 6, wherein the at least one splitter module comprises an input adapter for at least one fiber optic network cable and a plurality of output adapters for the at least two fiber optic subscriber cables and wherein the input adapter and output adapters of the at least one splitter module comprise multiple fiber adapters.

9. A terminal according to claim 6, wherein the terminal is selectively mounted on at least one of a pedestal, a cabinet, and a wall.

10. A terminal according to claim 6, wherein the optical fiber of at least one of the fiber optic network cable and the fiber optic subscriber cable comprises a microstructured optical fiber comprising a core region and a cladding region surrounding the core region, the cladding region comprising an annular hole-containing region comprised of non-periodically disposed holes.

11. A terminal according to claim 10, wherein the microstructured fiber has an 8 mm macrobend induced loss at 1550 nm of less than 0.2 dB/turn.

12. A fiber optic equipment rack for interconnecting optical fibers of one or more fiber optic subscriber cables with a fiber optic network cable in an indoor environment, the equipment rack comprising:

a frame comprising at least two vertical supports and at least one horizontal support joined therebetween; and at least one subscriber termination module selectively mounted to the frame, wherein the at least one subscriber termination module provides for selective optical connection of one or more fiber optic subscriber cables with one or more fiber optic network cables at a subscriber termination;

wherein the at least one subscriber termination module defines a density of subscriber terminations to unit of volume of the subscriber termination module of at least 80 terminations/ft$^3$.

13. An equipment rack according to claim 12, wherein the subscriber termination module defines a density of subscriber terminations to unit of volume of the subscriber termination module of at least 100 terminations/ft$^3$.

14. An equipment rack according to claim 12, wherein the at least one termination module provides an angled connection surface for the selective optical connections of the one or more fiber optic subscriber cables and the one or more fiber optic network cables, wherein the connection surfaces are angled relative to a front face of the frame defined by the vertical supports and horizontal support.

15. An equipment rack according to claim 12, wherein the at least one termination module comprises at least 72 optical connections between fiber optic subscriber cables and fiber optic network cables.

16. An equipment rack according to claim 12, wherein the optical fiber of at least one of the fiber optic network cable and the fiber optic subscriber cable comprises a microstructured optical fiber comprising a core region and a cladding region surrounding the core region, the cladding region comprising an annular hole-containing region comprised of non-periodically disposed holes.

17. An equipment rack according to claim 16, wherein the microstructured fiber has an 8 mm macrobend induced loss at 1550 nm of less than 0.2 dB/turn.

18. A fiber distribution hub for interconnecting optical fibers of one or more fiber optic subscriber cables with a fiber optic network cable, the fiber distribution hub comprising:

a housing defining an exterior wall and an interior cavity, wherein the interior cavity is selectively accessible through at least one moveable wall portion;

at least one opening through the exterior wall for the ingress and egress of the one or more fiber optic subscriber cables and one or more fiber optic network cables;

at least one splitter module within the interior cavity to split the optical signal of at least one fiber optic network cable to a plurality of network pigtails; and at least one subscriber termination field mounted within the housing and adapted to selectively optically connect the network pigtails to the fiber optic subscriber cables at subscriber terminations;

wherein the housing defines a density of subscriber terminations to unit of volume of the housing of at least 100 terminations/ft$^3$.

19. An equipment rack according to claim 18, wherein the housing defines a density of subscriber terminations to unit of volume of the housing of at least 150 terminations/ft$^3$.

20. A fiber distribution hub according to claim 18, further comprising a swing frame within the interior cavity of the housing, wherein at least one of the at least one splitter module and the at least one subscriber termination field is mounted to the swing frame.

21. A fiber distribution hub according to claim 18, wherein the fiber distribution hub is mounted on at least one of a pole, a pad, and a surface.

22. A fiber distribution hub according to claim 18, wherein the optical fiber of at least one of the fiber optic network cable, the plurality of network pigtails, and the fiber optic subscriber cables comprises a microstructured optical fiber comprising a core region and a cladding region surrounding the core region, the cladding region comprising an annular hole-containing region comprised of non-periodically disposed holes.

23. A fiber distribution hub according to claim 22, wherein the microstructured fiber has an 8 mm macrobend induced loss at 1550 nm of less than 0.2 dB/turn.

* * * * *